(12) United States Patent
Rogard et al.

(10) Patent No.: US 7,062,294 B1
(45) Date of Patent: Jun. 13, 2006

(54) DOWNLINK TRANSMISSION IN A WIRELESS DATA COMMUNICATION SYSTEM HAVING A BASE STATION WITH A SMART ANTENNA SYSTEM

(75) Inventors: Roger Rogard, Paris (FR); Michael Youssefmir, Portola Valley, CA (US); Bjorn Erik Ottersten, Palo Alto, CA (US)

(73) Assignee: ArrayComm, LLC., San Jose, CA (US)

( * ) Notice: Subject to any disclaimer, the term of this patent is extended or adjusted under 35 U.S.C. 154(b) by 984 days.

(21) Appl. No.: 09/676,887

(22) Filed: Sep. 29, 2000

(51) Int. Cl.
*H04M 1/00* (2006.01)

(52) U.S. Cl. .................. 455/562.1; 455/561; 455/25; 455/522; 455/68; 455/69; 370/334; 370/329; 370/330; 342/367; 342/372

(58) Field of Classification Search ........ 455/450–451, 455/9–10, 25, 504–506, 515–516, 67.11, 455/16, 561, 562.1, 418–420, 423–425, 452.1–2, 455/464, 509, 522, 13, 68–69; 375/219–221; 370/338, 389, 311, 318–320, 329–330, 332–334, 370/341, 345, 347, 364–365; 342/367–368, 342/371–374, 378–384
See application file for complete search history.

(56) References Cited

U.S. PATENT DOCUMENTS

| | | |
|---|---|---|
| 3,704,465 A | 11/1972 | Masak et al. |
| 3,774,209 A | 11/1973 | Fleming et al. |
| 3,798,645 A | 3/1974 | Baurle et al. |
| 3,852,749 A | 12/1974 | Kohler |
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |

(Continued)

FOREIGN PATENT DOCUMENTS

EP 0 639 035 A1 2/1995

(Continued)

OTHER PUBLICATIONS

Agee, "Blind Separation and Capture of Communication Signals Using A Multitarget Constant Modulus Beamformer", Oct. 7, 1989 Proc. IEEE Military Communications Conference, vol. 2, pp. 1-12.

(Continued)

*Primary Examiner*—Doris H. To
*Assistant Examiner*—Tuan Tran
(74) *Attorney, Agent, or Firm*—Blakely, Sokoloff, Taylor & Zafman LLP

(57) ABSTRACT

A method, device, and machine readable medium to communicate from a base station having a smart antenna system to a user terminal. The method includes providing a downlink channel for transmitting downlink data from the base station to the user terminal, providing an associated channel for the base station to receive an uplink response signal from the user terminal in response to the downlink data. The associated channel is associated, and has a predefined relationship, with the downlink channel. The method further includes providing an uplink data channel, distinct from the associated uplink channel, for the base station to receive uplink data from the user terminal. The method also includes receiving the uplink response signal at the base station, determining a downlink smart antenna processing strategy using the received uplink response signal, sending downlink data from the base station to the user terminal using the determined downlink smart antenna processing strategy, and receiving uplink data from the user terminal on the uplink data channel.

60 Claims, 5 Drawing Sheets

U.S. PATENT DOCUMENTS

| | | |
|---|---|---|
| 4,263,568 A | 4/1981 | Nemit |
| 4,316,191 A | 2/1982 | Sawatari et al. |
| 4,375,622 A | 3/1983 | Hollingsworth et al. |
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. |
| 5,276,907 A | 1/1994 | Meidan |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,574,977 A | 11/1996 | Joseph et al. |
| 5,576,717 A * | 11/1996 | Searle et al. ................. 342/373 |
| 5,592,490 A | 1/1997 | Barratt et al. |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,619,503 A | 4/1997 | Dent |
| 5,621,752 A | 4/1997 | Antonio et al. |
| 5,625,880 A | 4/1997 | Goldburg et al. |
| 5,625,885 A | 4/1997 | Nakazawa et al. |
| 5,638,375 A | 6/1997 | Dettro et al. |
| 5,642,353 A | 6/1997 | Roy, III et al. |
| 5,649,287 A | 7/1997 | Forssen et al. |
| 5,673,291 A | 9/1997 | Dent |
| 5,675,581 A | 10/1997 | Soliman |
| 5,678,188 A | 10/1997 | Hisamura |
| 5,684,794 A | 11/1997 | Lopez et al. |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,708,971 A | 1/1998 | Dent |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,870,393 A | 2/1999 | Yano et al. |
| 5,884,148 A | 3/1999 | Bilgic et al. |
| 5,884,178 A | 3/1999 | Ericsson et al. |
| 5,887,038 A | 3/1999 | Golden |
| 5,905,721 A | 5/1999 | Liu et al. |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,955,992 A | 9/1999 | Shattil |
| 5,970,394 A | 10/1999 | Arpee et al. |
| 5,973,638 A | 10/1999 | Robbins et al. |
| 5,999,826 A | 12/1999 | Whinnett |
| 6,005,854 A | 12/1999 | Xu et al. |
| 6,009,124 A | 12/1999 | Smith et al. |
| 6,018,317 A | 1/2000 | Dogan et al. |
| 6,018,555 A | 1/2000 | Mahany |
| 6,018,643 A | 1/2000 | Golemon et al. |
| 6,023,203 A | 2/2000 | Parish |
| 6,037,898 A | 3/2000 | Parish et al. |
| 6,061,553 A | 5/2000 | Matsuoka et al. |
| 6,064,865 A | 5/2000 | Kuo et al. |
| 6,067,324 A | 5/2000 | Harrison |
| 6,108,565 A * | 8/2000 | Scherzer ................. 455/562.1 |
| 6,122,260 A | 9/2000 | Liu et al. |
| 6,131,016 A | 10/2000 | Greenstein et al. |
| 6,141,567 A | 10/2000 | Youssefmir et al. |
| 6,154,661 A | 11/2000 | Goldburg |
| 6,167,248 A * | 12/2000 | Hamalainen et al. ....... 455/403 |

| | | | |
|---|---|---|---|
| 6,185,412 B1 | 2/2001 | Pentikainen et al. | |
| 6,185,440 B1* | 2/2001 | Barratt et al. | 455/562.1 |
| 6,192,256 B1 | 2/2001 | Whinnett | |
| 6,219,561 B1 | 4/2001 | Raleigh | |
| 6,229,481 B1* | 5/2001 | Katz | 342/367 |
| 6,292,664 B1 | 9/2001 | Ostrup et al. | |
| 6,337,985 B1 | 1/2002 | Roux et al. | |
| 6,463,295 B1* | 10/2002 | Yun | 455/522 |
| 6,615,024 B1* | 9/2003 | Boros et al. | 455/67.14 |
| 6,694,155 B1* | 2/2004 | Chin et al. | 455/562.1 |
| 6,763,062 B1* | 7/2004 | Kohno et al. | 375/220 |
| 6,795,409 B1* | 9/2004 | Youssefmir et al. | 370/328 |

FOREIGN PATENT DOCUMENTS

| | | |
|---|---|---|
| EP | 0 665 665 A1 | 8/1995 |
| EP | 0 713 261 A1 | 5/1996 |
| EP | 0 777 400 A2 | 6/1997 |
| EP | 0786914 A2 | 7/1997 |
| EP | 0 841 827 A2 | 5/1998 |
| GB | 2 237 706 A | 5/1991 |
| GB | 2 295 524 A | 5/1996 |
| GB | 2 313 261 A | 11/1997 |
| JP | 7-170548 | 4/1995 |
| JP | 2000031896 * | 1/2000 |
| WO | 95/34103 | 12/1995 |
| WO | WO 97/02262 | 7/1996 |
| WO | WO 97/08849 | 3/1997 |
| WO | 98/01963 | 1/1998 |
| WO | 98/17037 | 4/1998 |
| WO | 98/17071 | 4/1998 |
| WO | WO 98/28864 | 7/1998 |
| WO | WO 98/33346 | 7/1998 |

OTHER PUBLICATIONS

Aschied et al., "An All Digital Receiver Architecture for Bandwidth Efficient Transmission at High Data Rates", 1989, IEEE Transactions on Communications, vol. 37, No. 8, pp. 804-813.

Franks, "Synchronization Subsystems: Analysis and Design", 1981, Digital Communications Satellite/Earth Station Engineering, pp. 294-335.

Friedlander, "Direction Finding Using an Interpolated Array", Apr. 3, 1990, International Conference on Acoustics, Speech, and Signal Processing, vol. 5, pp. 2951-2954.

Friedlander et al., "Direction Finding for Wideband Signals Using an Interpolated Array", 1991, IEEE Publication, pp. 583-587.

Ganz et al., "A Data-Derived Reference Signal Technique for Adaptive Arrays", IEEE Transactions on Communications, vol. 37, No. 9, Sep. 1989, pp. 975-983.

Iltis et al., "A Digital DS Spread-Spectrum Receiver With Joint Channel and Doppler Shift Esitmation", IEEE Transactions on Communications, vol. 39, No. 8, Aug. 1991, pp. 1255-1267.

Lee et al., "Decision Directed Carrier Recovery—Chapter 16: Carrier Recovery", 1994 Digital Communications, 2nd Edition, Kluwer Academic Pub., pp. 725-736.

Lee et al., "Decision Directed Carrier Recovery—Chapter 17: Timing Recovery", 1994 Digital Communications, 2nd Edition, Kluwer Academic Pub., pp. 737-764.

Lundell et al., "Applications of the Constant Modulus Adaptive Beamformer to Constant and Non-Constant Modulus Signals", Proceedings, 1998 Asilomar Conference on Signals, Systems, and Computers (ACSSC-1988), pp. 432-436.

Muhamed et al., "Direction of Arrival Estimation Using Antenna Arrays", 1996, The Bradley Dept. of Electrical Enginerring, Mobile and Portable Radio Research Group, Section 3.8, pp. 64-71.

vander Veen et al., "A Constant Modulus Factorization Technique for Smart Antenna Applications in Mobile Communications", SPIE 1994 "Advanced Signal Processing Algorithms, Architectures, and Implementations V", vol. 2296, pp. 230-241.

Talwar et al., "Recursive Algorithms for Estimating Multiple Co-Channel Digital Signals Received at an Antenna Array", Proc. Fifth Annual IEEE Dual Use Technologies and Applications Conference.

Papadias et al., "A Space-Time Constant Modulus Algorithm for SDMA Systems", 1996, Proceedings, IEEE 46th Vehicular Technology Conference, pp. 86-90.

Talwar et al., "Blind Estimation of Multiple Co-Channel Digital Signals Arriving at an Antenna Array", 1993, Proc. 27th Asilomar Conference on Signals, Systems, and Computers, vol. 1, pp. 349-342.

Rashid-Farrokhi et al., "Joint Power Control and Beamforming for Capacity Improvement in Wireless Networks With Antenna Array", 1996 IEEE GLOBECOM 1996, vol. 1, pp. 555-559.

Rashid-Farrokhi et al., "Transmit Beamforming for Cellular Communication Systems", Conference on Information Sciences and Systems, CISS-97; Mar. 1997, 4 pages.

Rashid-Farrokhi et al., "Downlink and Uplink Capacity Enhancement in Power Controlled Cellular Systems", Proceedings, 1997 IEEE 47th Vehicular Technology Conference, vol. 2, May 1997, pp. 647-651.

Rashid-Farrokhi et al., "Downlink Power Control and Base Station Assignment", IEEE Communications Letters, vol. 1, No. 4, Jul. 1997, pp. 102-104.

Rashid-Farrokhi et al., "Transmit Diversity and Equalization for Power Controlled Wireless Networks", Conference Record 31st Asilomar Conference on Signals, Systems, and Computers, vol. 1, Nov. 1997, pp. 620-624.

Swidlehurst et al., "Analysis of a Decision Directed Beamformer", IEEE Transactions on Signal Processing, vol. 43, No. 12, Dec. 1995, pp. 2920-2927.

US98/25364, PCT Search Report, May 11, 1999.

European Examination Report dated Oct. 18, 2002.

Farsakh et al., "A Real Time Downlink Channel Allocation Scheme for an SDMA Mobile Radio System," IEEE International Symposium on Personal, Indoor and Mobile Radio Communications, vol. 3, Oct. 18, 1996, pp. 1215-1220.

Farsakh et al., "Channel Allocation and Downlink Beamforming in an SDMA Mobile Radio System," PIMRC '95, Wireless: Merging onto the Information Superhighway, 6th IEEE International Symposium on Toronto, Ont., Canada, Sep. 27-29, 1995, pp. 687-691.

Gerlach et al., "Base Station Transmitter Antenna Arrays with Mobile to Base Feedback," IEEE Asilomar Conference on Signals, Systems & Computers, 1993, pp. 1432-1436.

Ottersten, B., "Array Processing for Wireless Communications," Proc. 8th IEEE Signal Processing Workshop on Statistical Signal and Array Proc., Jun. 1996, pp. 466-473.

Zhang et al., "Performance of a Modified Polling Strategy for Broadband Wireless LANs in a Harsh Fading Environment," GLOBECOM '91, Jan. 1991, pp. 1141-1146.

Acampora et al., "A New Adaptive MAC Layer Protocol for Wireless ATM Networks in Harsh Fading and Interference Environments," 1997 IEEE, Aug. 1997, pp. 410-415.

Krishnamurthy et al., "Polling Based Media Access Protocols for Use With Smart Adaptive Array Antennas," 1998 IEEE, Jan. 1998, pp. 337-344.

Xu et al., "Throughput Multiplication of Wireless LANs for Multimedia Services: SDMA Protocol Design," 1994 IEEE, 1994, pp. 1326-1332.

* cited by examiner

DOWNLINK TRANSMISSION IN A WIRELESS DATA COMMUNICATION SYSTEM HAVING A BASE STATION WITH A SMART ANTENNA SYSTEM

RELATED PATENT APPLICATIONS

This invention is related to the following three concurrently filed pending U.S. patent applications, each assigned to the assignee of the present invention, and each incorporated herein by reference:
(1) Ser. No. 09/677,460, entitled "COOPERATIVE POLLING IN A WIRELESS DATA COMMUNICATION SYSTEM HAVING SMART ANTENNA PROCESSING," to inventors Trott, et al.
(2) Ser. No. 09/676,888, entitled "NON-DIRECTIONAL TRANSMITTING FROM A WIRELESS DATA BASE STATION HAVING A SMART ANTENNA SYSTEM," to inventors Barratt, et al.
(3) Ser. No. 09/676,885, entitled "REPETITIVE PAGING FROM A WIRELESS DATA BASE STATION HAVING A SMART ANTENNA SYSTEM," to inventor Trott.

BACKGROUND

The present invention relates to radio communications, and more particularly to radio communications methods in a cellular or similar wireless communication system between a base station transmitter/receiver (transceiver) and a plurality of remote user terminals, in particular for radio communication in a changing environment.

In such communication systems it is desirable to use directional antenna systems such as smart antenna systems to increase the signal-to-noise ratio of the communications link and reduce interference. The use of smart antenna systems can also provide resistance to multipath and fading.

A smart antenna system includes an array of antenna elements and a mechanism to determine the smart antenna processing strategy to increase the signal-to-noise ratio and/or reduce interference. A smart antenna system may be a "switched beam" system that includes a beamformer forming several fixed beams and a mechanism for combining one or more of the beams. A smart antenna system may alternately be an adaptive antenna array system that includes a smart antenna processing strategy determining mechanism that can achieve an infinitely variable antenna radiation pattern that can be adapted according to the processing strategy for the particular receiving or transmitting situation.

Smart antenna systems may be used for communication on the uplink (from a user terminal to a base station) or on the downlink (from a base station to a user terminal) or on both phases of communication.

Smart antenna systems may also permit spatial division multiple access ("SDMA"). With SDMA, more than one user terminal of a base station may communicate with the base station on the same "conventional" channel, that is, the same frequency and time channel (for an FDMA and TDMA system) or code channel (for a CDMA system), so long as the co-channel user terminals are spatially separated. In such a case, the smart antenna system provides for more than one "spatial channel" within the same conventional channel.

The transmission RF and interference environments can be relatively rapidly changing in a cellular system. In a packetized system, these environments may significantly change between sequential packet transmissions. Consider, for example, a cellular system that includes a base station that has a smart antenna system and one or more remote user terminals. In a rapidly changing environment, the determining of the appropriate smart antenna processing strategy needs to be adaptive to an uplink signal received from the mobile user during a time interval closely corresponding to the transmission period. Such adaption typically uses a radio signal from the user terminal to the base station, with the smart antenna processing strategy determined using such a received signal.

There is a need in the art for adapting to a rapidly changing RF and interference environment.

Polling

Consider a cellular system that includes several base stations, each having a set of one or more user terminals. It is known in the art how to determine the smart antenna processing strategy for a smart antenna system of a particular base station to achieve interference mitigation from co-channel user terminals that may be transmitting signals in the same channel but to other base stations. Such interference mitigation may be achieved by receiving radio signals at the particular base station from the interfering co-channel user terminals and distinguishing the desired signal from the interfering signals.

The particular base station may not be able to mitigate interference from other base stations' user terminals on the uplink, or mitigate towards other base stations' user terminals on the downlink. The particular base station may not have an adequate radio-frequency link to the other user terminals or may not have information on how to poll the other base stations' user terminals.

Initiating Communication

When initiating communication with a remote user terminal, the remote user terminal may be logged off the system or may be in an "idle" state in which no communication is taking place or has taken place relatively recently between the base station and the user terminal, or in which communication takes place at a relatively slow rate with substantial silent periods.

Initiating communication between a base station and a user terminal that may be in an idle state can be relatively difficult. The location of a user terminal may be unknown because, for example, it is mobile. Furthermore, interference patterns may be rapidly varying, so that even if the location is known, there may be considerable interference present that may reduce the likelihood of successful reception of the initiating (e.g., paging) message by the base station. Furthermore, the channel for paging may be heavily used by user terminals of other base stations. In such cases, the interference to the desired/intended user terminal may be considerable.

It is often desirable to page the user terminal on a conventional channel that may be heavily used on different spatial channels by other remote terminals of the same base station. In such a case, the interference to the user terminal may also be considerable.

Sending a paging message to page a user terminal is typically ideally carried in some manner that increases the likelihood that a user terminal at an unknown and possibly changing location in an environment with rapidly varying interference will successfully receive such paging (and other control signals) from its associated base station.

SUMMARY

One embodiment in a communication system is a method that includes providing a downlink channel for transmitting downlink data from a base station having a smart antenna system to a user terminal, providing an associated channel for the base station to receive an uplink response signal from the user terminal in response to the downlink data. The associated channel is associated, and has a predefined relationship, with the downlink channel. The method further includes providing an uplink data channel, distinct from the associated uplink channel, for the base station to receive uplink data from the user terminal. The method also includes receiving the uplink response signal at the base station, determining a downlink smart antenna processing strategy using the received uplink response signal, sending downlink data from the base station to the user terminal using the determined downlink smart antenna processing strategy, and receiving uplink data from the user terminal on the uplink data channel.

One embodiment also a method of communicating downlink data from a base station including a smart antenna system to a user terminal. The method includes providing a set of sequential time intervals for the base station, with each of the time intervals having a selected number of downlink channel and the selected number of associated channels on the uplink. Each associated uplink channel is associated with and has a predefined relationship to one of the downlink channels. The method further includes transmitting a downlink polling signal from the base station on a first downlink channel of a first time interval and receiving an uplink response signal at the base station from the user terminal in response to the user terminal's receiving the downlink polling signal. The receiving the uplink response signal is on the associated uplink channel associated with the first downlink conventional channel of the first time interval. The method includes determining a downlink smart antenna processing strategy for transmission to the user terminal using the received first uplink response signal, and transmitting downlink data from the base station to the user terminal on the first downlink channel using the determined downlink smart antenna processing strategy.

BRIEF DESCRIPTION OF THE DRAWINGS

FIG. 2A shows one configuration in which the smart antenna system is an adaptive antenna array system and adaptation occurs in baseband. FIG. 2B shows an alternative base station with a switched beam smart antenna system that includes a beam-forming network.

DETAILED DESCRIPTION

A Cellular System and its Smart Antenna Base Station

Figure 1:
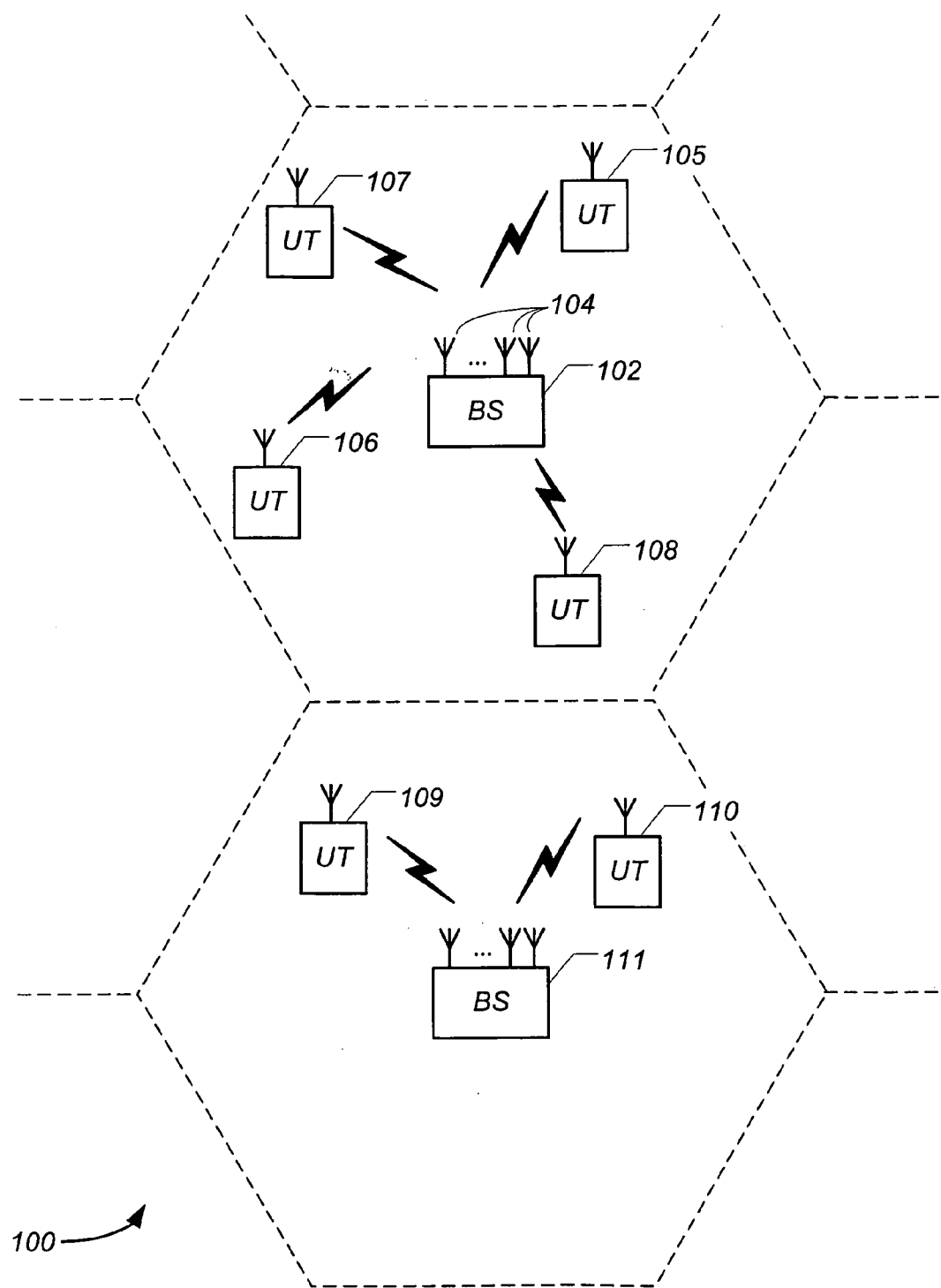
FIG. 1 is a diagram of a communication system that includes at least two base stations, at least one base station having a smart antenna system.

Referring to FIG. 1 there is generally shown a cellular wireless communication system 100 having at least two base stations, a first base station 102 and at least one second base station 111, with the first base station 102 including a smart antenna system that has an array of antenna elements 104. System 100 also includes a plurality of remote, possibly mobile user terminals 105, 106, 107, and 108 for conducting bi-directional packet communications with first base station 102, and a plurality of remote, possibly mobile user terminals 109 and 110 for conducting bi-directional packet communications with the other base stations, such as second base station 111. First base station 102 is said to be associated with user terminals 105, 106, 107, and 108, while second base station 111 is associated with user terminals 109 and 110.

The first base station 102 is coupled to a network such as a data and/or voice network. The one or more second base stations 111 may also be coupled to the same network. In one embodiment, the first base station and other base stations 111 are coupled to the Internet.

Figure 2A:
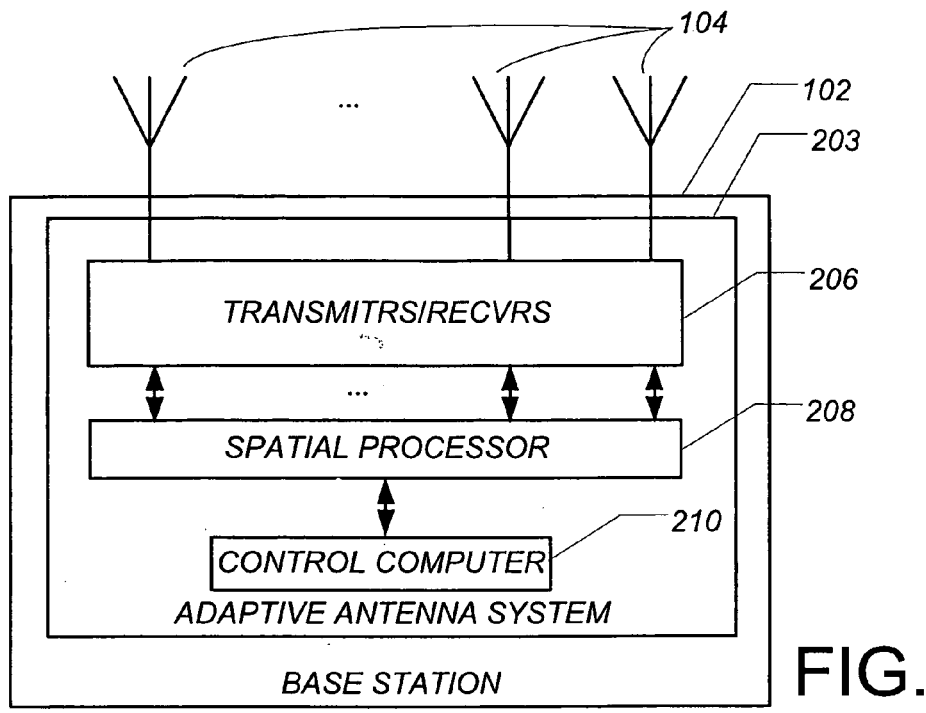
FIGS. 2A and 2B illustrate two embodiments of a base station using a smart antenna system.

FIG. 2A shows one embodiment of first base station 102. The base station includes a smart antenna system 203 that is an adaptive antenna array system. Smart antenna system 203 has an array of antenna elements 104, a set of transmitters and a set of receivers, implemented in one embodiment as a set of transmitter/receivers ("transceivers") 206, with one transmitter and one receiver for each individual antenna element of array 104, and a spatial processor 208 for performing uplink and downlink smart antenna processing.

Uplink smart antenna processing includes combining the signals received from the individual antenna elements via the set of transceivers, and downlink smart antenna processing includes generating multiple versions of a signal for transmission from the individual antenna elements via the set of transceivers. A control computer 210 controls the smart antenna processing. Spatial processor 208 and control computer 210 comprise one or more digital signal processing devices (DSPs); any other mechanisms for achieving the uplink and downlink smart antenna processing and control may be used.

On the uplink, the smart antenna processing is carried out under control of the control computer 210 by weighting the received signals in amplitude and phase according to a set of uplink weighting parameters to advantageously combine the received signals. Such combining is referred to as uplink spatial processing and uplink smart antenna processing. The uplink smart antenna processing strategy, in this case, is defined by the set of uplink weighting parameters. Such combining may further include temporal filtering for time equalization, and when combined with spatial processing, such combining is called uplink spatio-temporal processing or again, uplink smart antenna processing. Spatio-temporal processing is performed according to an uplink smart antenna processing strategy defined by a set of uplink weighting parameters that includes temporal processing parameters for signals originating at each of the antenna elements. For simplicity, the terms uplink spatial processing and uplink smart antenna processing shall mean either uplink spatio-temporal or uplink spatial processing herein.

The uplink strategy is typically determined based on signals received at the antenna elements of the base station 102, and in one embodiment, the downlink strategy is determined also based on the signals received at the antenna elements.

Thus, in one embodiment, the base station 102 includes a downlink transmission unit coupled to the antenna elements to transmit downlink data on a downlink channel to an associated remote user terminal, an uplink reception unit, coupled to the antenna elements to receive an uplink signal from the remote user terminal, and a processor, coupled to the downlink transmission unit, and further coupled to the uplink reception unit, the processor to determine a downlink smart antenna processing strategy based on the uplink response signal.

Note that while in one embodiment, the antenna elements 104 first base station 102 are each used for both transmission and reception, in another embodiment, the plurality of antenna elements include a separate antennas for reception and transmission.

A user terminal such as 105, 106, 107, 108 typically includes an antenna system and a transceiver, and may be coupled to input and/or output devices and/or processing devices to provide various types of functionality, such as voice communications and/or data communications over the Internet or other data communication network. Such a user terminal may be mobile or stationary. In one embodiment, the antenna system may have a single antenna, or, in another embodiment, may include a plurality of antenna elements to facilitate diversity reception and transmission. In yet another embodiment, the antenna system may include a smart antenna system. The user terminals, in one embodiment, may even be able to communicate voice and/or data between each other. Coupled to, or as part of the user terminal may be one or more of a computer such as a laptop computer, a two-way pager, a personal digital assistant (PDA), a video monitor, an audio player, a cellular telephone, or other device that may communication voice or data in a wireless fashion with another communication device or communication station, such as a base station.

When a signal is received from one of the remote transmitters 105, 106, 107, 108, the adaptive spatial processor 208 responds to the amplitude and phase of the signals as received at each of the antenna elements of array 104 and performs uplink spatial processing that combines the signals in a manner that effectively provides a directional reception pattern that advantageously enhances the signal link from the user terminal to the base station, including compensation for multipath conditions that might exist, and providing interference mitigation.

Various techniques are known for determining the uplink smart antenna processing strategy as defined by the weighting parameters. In one embodiment, a known training sequence of symbols is included in the uplink signal. One version of the embodiment uses a least squares method for the strategy determining. In another embodiment, a "blind" method is used, according to which a reference signal is constructed that has one or more properties that the uplink signal is known to have, for example, a constant modulus or a particular modulation format. Either the known signal or the constructed reference signal is used to form an error signal, and uplink smart antenna strategy determining determines the uplink weighting parameters that optimize some criterion based on the error. In one embodiment, the criterion is a least squared error criterion.

One embodiment may even operate in accordance with spatial division multiple access ("SDMA"). With SDMA, more than one user terminal associated with the first base station 102 can communicate with the first base station 102 on the uplink on the same "conventional" channel, that is, the same frequency and time channel (for an FDMA and TDMA system) or code channel (for a CDMA system), so long as the co-channel remote users are spatially separated. In such a case, the smart antenna system provides for more than one "spatial channel" within the same conventional channel, and the adaptive spatial processor 208 performs uplink spatial processing to mitigate interference from remote terminals associated with the first base station 102 that share the conventional channel with a desired user terminal.

The first base station 102 is also used to transmit a signal to one or more of the remote units 105, 106, 107, 108 in a manner that effectively provides a directional signal pattern that advantageously enhances the signal link from the base station to the user terminal, including compensation for multipath conditions that might exist and mitigating interference. SDMA is also possible in the downlink direction, permitting the base station to transmit to more than one of its associated user terminals on the same conventional channel. That is, the same conventional channel can have more than one spatial channel.

On the downlink, the spatial processor 208, under control of the control computer 210, generates various versions of a signal to be transmitted to a remote terminal by weighting the signal in amplitude and phase according to a set of downlink weighting parameters. Such processing is generally referred to as downlink spatial processing or downlink smart antenna processing. The downlink smart antenna processing strategy, in this case, is defined by the downlink weighting parameters. Such processing may further include temporal filtering for time equalization, and when combined with the weighting, such smart antenna processing is called downlink spatio-temporal processing. Downlink spatio-temporal processing is performed according to a downlink smart antenna processing strategy defined by a set of downlink weighting parameters that includes temporal processing parameters for signals to be transmitted by each of the antenna elements. For simplicity, the term downlink spatial processing and downlink smart antenna processing shall mean downlink spatio-temporal or spatial processing herein.

Various mechanisms are known for determining a downlink smart antenna processing strategy defined in this case by downlink weighting parameters. One embodiment operates in a communication system 100 that is a TDMA system that uses time domain duplexing (TDD), so that the uplink and downlink frequency between a particular user terminal and its associated base station are the same. The downlink weighting parameters are typically determined from the uplink weighting parameters for the same user terminal. Calibration factors are included in determining downlink weighting parameters from uplink weighting parameters to compensate for the differences in distortion, for example, the differences in the amplitude and phase shifts that occur in the signals as they pass through the different receive and transmit chains that are coupled to each of the antenna elements of array 104. Such a chain includes the antenna element, cables, filters, RF receiver, RF transmitter, physical connections, and analog-to-digital converter if processing is digital. U.S. Pat. No. 5,546,090, and U.S. patent application Ser. Nos. 08/948,772 and 09/295,434, each assigned to the assignee of the present invention, for example, include descriptions of methods and apparati for calibration.

In an alternate embodiment for operation in communication systems that do not use time domain duplexing, for example in an embodiment of the invention operating in a system that uses frequency domain duplexing (FDD) in which the uplink and downlink frequencies for communicating with a particular user terminal are not the same, various techniques are available for determining the downlink weighting parameters from uplink signals received from user terminals, including but not limited to determining the directions of arrival (DOA) for the user terminals.

Figure 2B:
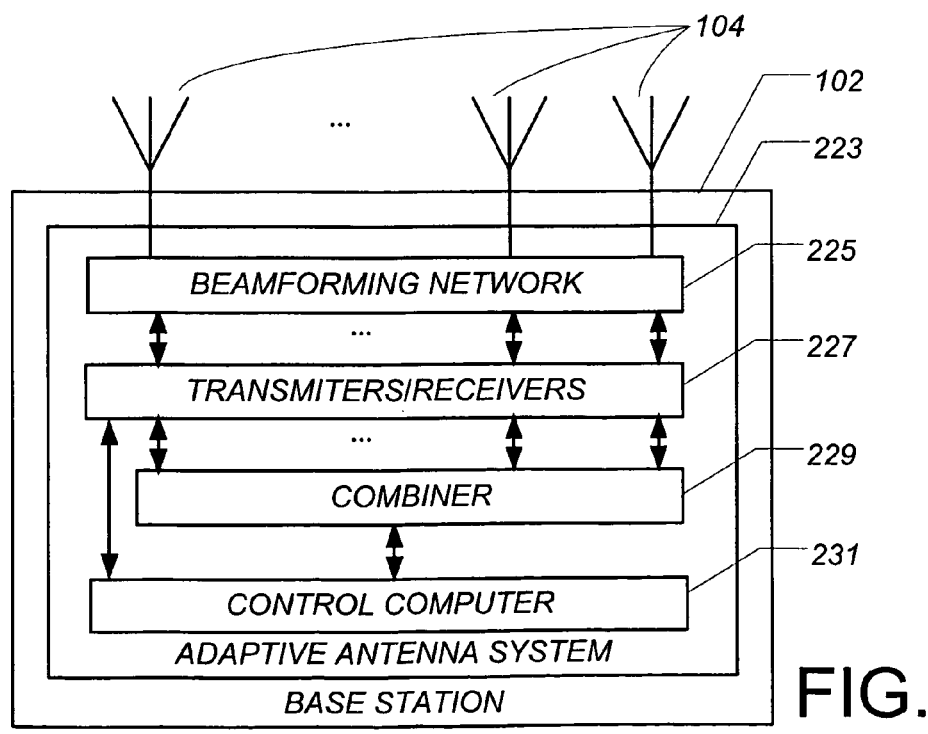

FIG. 2B shown an alternate embodiment of first base station 102 which includes a smart antenna system 223 that is a switched beam system. Smart antenna system 223 has an array of antenna elements 104, a beamforming network 225 that forms a set of fixed beams for the antenna elements of array 104, a set of transceivers 227, with one transmitter/receiver for each individual beam terminal of beamformer 227, and combiner 229 for combining one or more of the beams of transceivers 227. An included control computer 231 controls the smart antenna system. Exemplary beamformers include but are not limited to, a Butler matrix. The combiner 229 selects one or more of the fixed beams to use on the uplink or downlink, and may include a switching network to select the one or more beams. Combiner 229 may further include a mechanism for combining the one or more beams. As with the adaptive smart antenna system of FIG. 2A, the determining of how to control the switched beam smart antenna system for downlink communication is referred to as determining the uplink smart antenna processing strategy. The processing of combiner 229 during downlink communication is referred to as downlink spatial processing. On the uplink, the combining operates by weighting selected beams according to a set of uplink weighting parameters to advantageously combine the received signals. As with the adaptive smart antenna system of FIG. 2A, such uplink combining is referred to as uplink spatial processing, and determining the combination for uplink communication is referred to as determining the uplink smart antenna processing strategy.

More particularly, when a signal is received from one of the remote transmitters in remote units 105, 106, 107, 108, the beam combiner 229 responds to the signals as received at each of the antenna elements of array 104 and performs uplink spatial processing that combines the beams from beamformer 225 in a manner that effectively provides a directional signal pattern that enhances the signal link from the user terminal to the base station, including compensating for multipath conditions that might exist and, in accordance to an aspect of the invention, mitigating interference.

Referring still to FIG. 2B, on the downlink, the combiner processes a signal to determine weighted versions to transmit via one or more selected beams of beamformer 225. The processing of the combiner is to improve the transmission from the base station to the user terminal, including compensating for multipath conditions that might exist and, in accordance to an aspect of the invention, mitigating interference.

In both the embodiments of FIGS. 2A and 2B, in accordance with one aspect of the invention, signals are also received from co-channel interferers such as remote units 109 and 110 of other base station(s) 111. The spatial processing uses these received signals in a manner that mitigates interference from co-channel users such as remote units 109 and 110 of other base stations 111.

Adaptive determining of a favorable smart antenna strategy, particularly for moveable user terminals or a multipath environment or for data communications in a computer network such as the Internet, or a combination of such factors, as in a cellular system, is best done at the particular time of a data communication, because of the changing RF and interference environment. In the case of the remote user terminal being mobile, movement of the user terminal can result in the user terminal moving between a favorable and an unfavorable location between subsequent data transmissions. In the case of data transmission, for example data transmitted between the user terminal and first base station 102 when the communication system 100 is part of a computer network such as the Internet, the interference environment may be changing rapidly. Thus, for the first base station 102, interferers such as remote terminals 109 and 110 may be transmitting to their respective second base station 111 at different times, and such an interference pattern may change rapidly.

Initiating Communication from a Base Station

For initiating communication on the downlink from first base station 102, in order to rapidly determine the optimum smart antenna processing strategy, in accordance with one embodiment of the present invention, the first base station 102 transmits an initial downlink paging message to the user terminal in an agreed-upon logical control channel to indicate that the first base station 102 wants to commence communication.

A user terminal may be not logged in, or may be in an idle state in which it is logged in and authenticated, but not in active communicational exchange with its associated base station, or in an active state in which it is actively communicating with its associated base station. When a user terminal is in an idle state, both the base station and user terminal are prepared to initiate communication. Furthermore, both the base station and its idle terminals have information indicating the set of potential channel or channels for the base station to page the user terminal, or for the user terminal to initiate communication with the base station.

Note that a user terminal may have the ability to communicate on more than one channel, and thus may be idle on one channel and active on another. By idle is meant idle on the channel of interest. It should be appreciated that an idle user terminal may be not idle on other channels.

Sending a paging message to page a user terminal is desirably carried out in some manner that increases the likelihood that a user terminal at an unknown and possibly changing location in an environment with relatively rapidly varying interference will successfully receive such paging (and/or other control signals) from its associated base station.

One aspect of the invention entails transmitting a downlink signal in a non-directional manner, while simultaneously mitigating interference towards one or more user terminals known to the base station to be undesired user terminals, in that each of the one or more user terminals may receive one or more signals in the particular downlink channel during the transmitting of the downlink signal.

Non-directional manner, as used herein, refers to not intentionally directing energy towards any particular user or users. In a sectorized system, this means non-directional within the sector. Furthermore, substantially non-directional means also non-directional on the time average when the overall transmission is broken up into a set of repeated transmissions, each possibly with a different strategy.

One aspect of the invention entails a method for reliably initiating communication from a base station such as first base station 102 to a particular user terminal in a wireless packet data system such as system 100. The method is particularly useful for base stations that have a smart antenna system as will be explained below.

One embodiment of the method includes transmitting a relatively heavily encoded, relatively low-rate paging message by first base station 102 for the express reason of getting the user terminal to respond. The encoding is one of the methods facilitating a relatively high probability of detection at the user terminal. A low-rate signal is sent because not much information is being transmitted. The user terminal detects and responds to the paging message. The response is then used by the base station to acquire information about the communication link for subsequent transmission. This information about the communication link generally provides reliable and relatively high-rate (e.g., traffic data) communication between the base station and the user terminal. User terminals of other base stations may also be responding to their respective base stations on the same conventional channel, and such responses also may be used by first base station 102 to mitigate interference to or from the interfering co-channel user terminal(s) in the subsequent downlink or uplink transmissions.

Paging in a Downlink Channel that Shares Downlink Data Transmissions between Multiple User Terminals In one embodiment, a paging message may be sent in a logical control channel that can occupy the same conventional channel as other data such as traffic data being communicated between first base station 102 and one or more user terminals.

Furthermore, the paging message may be sent from first base station 102 in a logical control channel that can occupy the same conventional channel as other data such as traffic data or paging data being communicated between other base stations and one or more user terminals of such other base stations.

Furthermore, the paging message may be sent from first base station 102 in a logical control channel that can occupy the same conventional channel as other user terminals associated with the first base station 102 and other users of one or more other base stations.

One embodiment includes providing a unique paging sequence called UT_Sequence for each user terminal. This sequence may be generated in many ways. For example, the base station identification and/the user terminal identification numbers could be used as inputs to a PN sequence generator. The resulting bits are then modulated and the resulting I/Q baseband sequence forms the UT_Sequence. Many other ways of generating UT_Sequence are possible. For example, the user terminal identification number could be encoded using a low-rate error correction code, and the encoded number scrambled by a XOR operation with the output of a PN sequence generator initiated with all of or part of the base station identification number. The UT_Sequences are such that the probability of two user terminals having the same paging sequence is relatively low, and, in one embodiment, a UT_Sequence is unique to each user terminal in the system. In one embodiment, the UT_Sequence includes coding to provide a very large degree of redundancy in order to increase the likelihood of successful reception of a UT_sequence at the desired user terminal.

Each user terminal listens on an agreed upon logical control channel, attempting to detect its UT_Sequence. This logical control channel may be a control channel, or, in accordance with an aspect of the invention, may be a conventional channel also used for traffic by other user terminals in the system.

The user terminal uses a user terminal sequence detection criterion until it successfully detects its UT_Sequence. One detection method uses correlation, with the detection criterion including a correlation threshold.

The first base station 102, in some agreed upon manner, has information indicating on what channel or channels the desired user terminal is listening, and the base station transmits the UT_Sequence on this channel. The channel or channels to listen to, for example, may be agreed upon during an initial exchange during registration ("logging in") of the user terminal with its associated base station, or may be pre-set. The first base station 102 determined a smart antenna processing strategy for its smart antenna system to increase the probability of successful reception of the UT_Sequence by reducing the likelihood that interference will prohibit communication.

Prior to paging, the first base station 102 may be receiving signals ("prior-to-paging received signals") from one or more of its associated user terminals during a time in which the to-be-paged user terminal is idle and thus known to be not transmitting, but during which time any user terminal or terminals associated with first base station 102 that may be receiving data from first base station 102 at the same time and on the same conventional channel as the paging message, are transmitting on the uplink to first base station 102.

The first base station 102 uses the prior-to-paging received signals to determine a downlink smart antenna processing strategy for its smart antenna system to transmit simultaneously the data to such co-channel user terminals and the paging message on different spatial channels of the same conventional channel.

In addition to receiving signals from its associated user terminals, the first base station 102 may be receiving signals from interferers. The first base station 102 distinguishes signals from its own associated user terminals from the signals from interferers. In one embodiment the distinguishing uses a user terminal identifier.

Note also that there may be no other user terminals associated with the first base station 102 that may be sharing the downlink conventional channel with the paging message.

One or more other base stations also may be included in communication system, and in one embodiment, the other base station(s) are coordinated with first base station 102, such that in addition to first base station 102 receiving the prior-to-paging received signals, the first base station 102 may receive signals ("other-user-terminal received signals"), prior to paging the to-be-paged user terminal, from one or more other user terminals associated with the other base station(s), the other user terminals including being those that may be transmitted to during, and on the same conventional channel as the paging message. First base station 102 distinguishes signals from its associated user terminals signals from signals from the other user terminal(s) associated with the other base station(s). Note that the other user terminal(s) associated with the other base station(s) may be receiving data from their respective associated base station(s) at the same time and the same conventional channel as the paging from first base station 102.

Each base station uses a protocol to communicate with its associated user terminals, so that two base stations being coordinated includes that the protocols used by the base stations are coordinated.

The first base station 102 uses the prior-to-paging received signals and the other-user-terminal received signals to determine a downlink smart antenna processing strategy for its smart antenna system to transmit simultaneously data to its associated co-channel user terminals and the paging message on different spatial channels of the same conventional channel, while mitigating interference to the user terminal associated with first base station 102 and to the other user terminals(s) from which it received the other-user-terminal received signals.

In accordance with one embodiment, the downlink smart antenna processing strategy determining uses downlink weighting parameters determined from uplink weighting parameters by using calibration. The uplink weighting parameters are determined from signals received at the antenna elements of the antenna array that correspond to the prior-to-paging received signals and the other-user-terminal received signals.

In one embodiment, the smart antenna processing strategy determining uses the transmit covariance matrix determined, using calibration, from the receive covariance matrix of the signals received at the antenna elements of the antenna array that correspond to the prior-to-paging received signals and the other-user-terminal received signals. In particular, the strategy includes interference mitigation using the interference covariance matrix for signals arriving from interfering remote users.

Let $Z_R$ be the m by n matrix of received signals on the antenna elements for all signals received at the base station from its associated user terminals in the conventional channel to be used for paging, with each row being a vector of n complex valued (I and Q values) samples of the signal received in one of the m antennas. Let $z_R$ be the m by 1 vector of complex random variables (I and Q values) representing the signal and noise received in each of the m antennas. The receive covariance matrix is defined as $R_R = E[z_R z_R^H]$ where $E[.]$ is the expectation operation and the superscript H represents the complex conjugate transpose operation, that is, the Hermitian transpose, so that for m antenna elements, the receive covariance matrix $R_R$ is an m by m matrix. In the absence of any desirable uplink signals, that is, if only interference is present in a channel as would occur when the desired user terminal is in an idle state, the receive covariance matrix is the receive interference covariance matrix defined as $R_{RI} = E[z_{RI} z_{RR}^H]$ where $z_{RI}$ is the vector of complex valued (I and Q values) random variables of signals arriving at one of the m antenna elements of the antenna array from the transmitting interfering remote terminals.

The received interference covariance matrix contains information about the average spatial behavior of the interfering remote terminals. The eigenvectors of this matrix define the average spatial direction occupied by the interference. The eigenvalues of the received interference covariance matrix indicate the average power occupied by the interference in each of the eigenvalue directions. Thus, eigenvector directions that are associated with relatively large eigenvalues indicate spatial directions that receive a relatively large amount of average interference power while the eigenvector directions associated with relatively small eigenvalues indicate spatial directions that receive relatively less average interference power.

In one embodiment, the expectation operation is carried out by averaging over the samples of the signals. That is, $R^R = Z_R Z_R^H$ and $R_{RI} = Z_{RI} Z_{RI}^H$ where $Z_{RI}$ is the m by n matrix of received signal samples on the antenna elements for signals received at the base station absence of any desirable uplink signals, again with each row being a vector of n complex valued (I and Q values) samples of the signal received in one of the m antennas.

In one embodiment, the receive covariance matrix is used to determine a favorable downlink processing strategy that includes mitigating interference towards undesired co-channel user terminals. When some of the set of co-channel user terminals transmitting during the calculation of the receive co-variance matrix are also receiving when the first base station transmits, such a strategy is relatively effective for achieving the interference mitigation.

In accordance with one aspect of the invention, prior to paging, the received interference covariance matrix is determined by sampling during a time in which the to-be-paged users are known to be not transmitting (e.g., in the idle state), but during which the undesired user terminals that may be receiving on the downlink at the same time and on the same conventional channel as the paging message may be transmitting on the uplink to their respective base station.

Alternatively, the interference covariance matrix may be determined from performing uplink spatial processing on signals received at first base station 102 at a time in which both the to-be paged user terminals and the other user terminals—those that may later be receiving on the downlink on the same conventional channel and time as the paging—may be transmitting. The uplink spatial processing determines the signals from the to-be-paged user terminals, and subtraction determines the interfering signals.

The receive covariance matrix is determined from signals (e.g., the prior-to-paging received signals and the other-user-terminal received signals) received by first base station 102 at a time when the potential co-channel remote terminals are likely transmitting data and when the desired user terminal is idle. This receive covariance matrix is equal to the receive interference covariance matrix, and may be used to advantageously determine the smart antenna processing strategy for receiving signals, including interference mitigation from the interfering transmitters.

The transmit spatial processing for paging, including interference mitigation towards undesired user terminals, can thus be determined from the receive interference covariance matrix determined when the undesired user terminals are transmitting on the uplink, provided calibration or another operation is performed to account for the differences in the electronic apparatus chains to and from the different antenna elements. In particular, the set of downlink weighting parameters for downlink spatial processing for transmitting the paging are taken from the eigenvectors of the received interference covariance matrix that have a relatively small value, preferably but not necessarily the smallest value.

Note that as described further below, in accordance with one embodiment, active traffic communication between the base stations of system 100 and its associated user terminals occurs in sets of sequential time intervals (frames), and each frame is divided into a selected number of downlink conventional channels (e.g., time periods for a TDMA system). For each downlink conventional channel, there is an associated acknowledgement conventional channel (e.g., time period for a TDMA system) on the uplink. The description hereinafter will generally apply to one embodiment of the invention used in a TDMA system, but the invention is not limited to TDMA systems.

In a TDMA system, each frame is divided into a selected number of downlink data transfer periods (timeslot), and for each downlink data transfer period, there is an associated acknowledgement transfer period (timeslot) on the uplink. After communication is established between first base station 102 and a desired user terminal, a downlink data transmission from first base station 102 to the user terminal is preceded by an acknowledgement signal from that user terminal during an earlier associated acknowledgement transfer period, preferably but not necessarily, the most recent acknowledgement transfer period on the uplink associated with the downlink data transfer period of the downlink data transmission. The acknowledgement signals received on the uplink are used to advantageously determine a processing strategy for the smart antenna system of first base station 102 to transmit to the desired user terminal in a future—preferably but not necessarily, the next—downlink data transfer period associated with the acknowledgement transfer period. Furthermore, the sets of sequential time periods used by base stations are coordinated so that other acknowledgements from interfering user terminals of the same or other base stations are also received at first base station 102 and used to determine the smart antenna processing strategy. Thus, the number of user terminals of the communication system 100 transmitting to their respective base stations during an acknowledgment period on the uplink is a superset of the set of active desired user terminals that may be transmitted to during the associated future— preferably but not necessarily, next—downlink data transfer period.

In one embodiment for transmitting a paging message to an idle user terminal during a particular downlink data transfer period, the downlink smart antenna processing strategy is determined using calibration and the eigenvector having the smallest eigenvalue of the covariance matrix determined from signals received during the previous associated acknowledgement transfer period on the uplink.

Using such a paging strategy includes interference mitigation to those user terminals from which signals (e.g., the prior-to-paging received signals and the other-user-terminal received signals) were received by the first base station 102 during the previous associated acknowledgement transfer period on the uplink. The eigenvectors of the receive covariance matrix corresponding to such received signals from transmitting user terminals would have eigenvalues significantly larger than the smallest eigenvalue. Thus, in one embodiment, the paging message is sent in the direction of what was the least powerful interferer on the uplink to minimize interference towards co-channel users.

In alternative embodiments, an eigenvector of the transmit (interference) covariance matrix that has a value less than a provided threshold may be used for determining the downlink smart antenna processing strategy (e.g., the downlink weighting parameters) to use for paging. Such an eigenvector is substantially in the null space of the transmit interference covariance matrix.

Our definition of transmitting in a non-directional manner as referred to herein includes null space transmitting which "directs" energy in the direction of relatively small eigenvectors of the convariance matrix.

In yet another alternate embodiment, the receive signal covariance matrix determined at a time when the potential co-channel remote terminals are likely transmitting data and when the desired user terminal is idle, is used with calibration to expressly direct nulls in the direction of undesired co-channel users while transmitting the paging message in other directions according to an omnidirectional radiation pattern. An omnidirectional pattern is a special case of transmitting in a non-directional manner. In a sectorized system, omnidirectional means substantial omnidirectional within the sector. Furthermore, substantially omnidirectional means also substantially omnidirectional on the time average when the overall transmission is broken up into a set of repeated transmissions, each possibly with a different strategy.

U.S. patent application Ser. No. 08/988,519 to Goldburg, filed Dec. 12, 1997 and assigned to the assignee of the present invention, provides a description of one method to determine downlink spatial processing weighting parameters to achieve any desirable radiation pattern. In accordance to the Goldburg method, the weights are determined by optimizing an optimality criterion. For the alternate embodiment of the present invention, the Goldburg method can be modified to include directing nulls towards the likely interferers as determined from the covariance matrix.

Alternatively, a direction-of-arrival (DOA)-based method may be used to determine the downlink smart antenna processing strategy.

An alternate method of mitigating interference towards the undesired user terminals include forming side information about the undesired user terminals from signals received at first base station 102 from the undesired user terminals at some earlier time. The side information may be stored in a database in first base station 102.

Side information about an undesired user terminal is information about the user that can be used to determine a strategy that includes mitigating interference towards the undesired user terminal. An example of such stored side information about a user terminal is the spatial signature of the user terminal. For example, U.S. Pat. No. 5,592,490 to Barratt, et al., entitled "SPECTRALLY EFFICIENT HIGH CAPACITY WIRELESS COMMUNICATION SYSTEMS," and U.S. Pat. No. 5,828,658 to Ottersten, et al., entitled "SPECTRALLY EFFICIENT HIGH CAPACITY WIRELESS COMMUNICATION SYSTEMS WITH SPATIO-TEMPORAL PROCESSING," provides a description of some techniques to mitigate interference using spatial signatures. The receive spatial signature characterizes how the base station array receives signals from a particular user terminal in the absence of any interference or other user terminals. The transmit spatial signature of a particular user terminal characterizes how the remote user terminal receives signals from the base station absence of any interference. A transmit spatial signature may be determined from a receive spatial signature using calibration.

The side information is retrieved from the database and used to determine a smart antenna processing strategy to include interference mitigation towards at least one of the undesired user terminals.

The side information may be formed from signals received from the undesired user terminals at the same first base station 102. Alternatively, the communication system may include at least one second base station and an inter-base-station communication mechanism, which may be hard-wired and/or wireless. One or more other base stations receive the signals from the undesired user terminals, and the side information forming step for each undesired user terminal occurs at the other base station receiving the signal from such each undesired user terminal. The side information is communicated to first base station 102 using the inter-base-station communication mechanism. When such a method is used, the other such base station communicates to first base station 102 which of the undesired users are "really" undesired.

Other forms of side information include DOA of the one or more undesired user terminals, and indeed, received signals from the undesired user terminals.

While one embodiment embodies a method that operates in a TDD system, the invention is also applicable for operation in a FDD system. In a FDD system, the transmit and receive channels are in general not correlated with one another at any given instant in time. DOA-based techniques may be used for determining the downlink smart antenna processing strategy from the directions of arrival of user terminals. Furthermore, the transmit and receive covariance matrices are typically substantially equal in an FDD system when sufficient time averaging is used in the calculation of the received covariance or interference covariance matrix, particularly when the uplink frequency is relatively close to the downlink frequency. In such a case, using a downlink spatial processing strategy determined from the uplink spatial processing strategy, including calibration, may provide satisfactory results, as described, for example, in PCT International Patent Application Publication No. WO 98/09385 published Mar. 5, 1998, to Clarity Wireless, Inc., Raleigh, et al., inventors, entitled "SPATIO-TEMPORAL PROCESSING FOR COMMUNICATION."

The invention is also applicable to CDMA systems. Often, CDMA systems provide substantially all the resources in a frequency channel to a small number of user terminals. Thus, the eigenvalues related to eigenvectors of the receive covariance matrix corresponding to transmitting user terminals will be significantly larger than the smallest (i.e., null space) eigenvalues.

Thus, one embodiment of the invention allows a base station to send a downlink message to a desired user terminal in a non-directional manner (e.g., page a remote terminal) such that interference to the other user terminals is simultaneously mitigated. Furthermore, in one embodiment, the first base station 102 simultaneously sends other data to one or more other user terminals. Thus, on embodiment of the invention also provides for combining directed traffic (such as ongoing traffic data) and broadcast traffic (such as a page) over the same conventional channel.

Repetitive Paging

In response to successfully receiving a paging messages, the user terminal transmits a signal to the first base station 102. The user terminal responds by sending a random access request signal to the base station in an agreed upon channel. The first base station 102 then transmits an access assignment message to the user terminal that includes designating a frequency channel and a downlink transfer time period for the traffic communication. The access assignment message may be used also to carry out several control functions, including measuring the path loss in the link between the user terminal and the base station and/or for performing power control.

The paging message is preferably but not necessarily relatively heavily coded. Many methods are available for detecting such heavily coded UT_Sequences from signals received at the user terminal's receive antenna. One such technique uses correlation.

The random access request signal is thus an indication to the first base station 102 that the desired user terminal has successfully detected its UT_Sequence. In one version, the absence of a random access request signal provides feedback to base station 120 that the desired user terminal has not successfully received the page. Other methods of providing feedback of success or failure also may be used in other embodiments of the invention.

Thus, in one embodiment, the first base station 102 receives feedback that indicates whether or not the desired user terminal has successfully received a page.

Another aspect of the invention is a method to further increase the likelihood of successful page reception detection by repeating the transmission of the page one or more times using identical repetition, i.e., using an identical downlink strategy in the same relative time part of a future frame in a repeating manner. Non-identical repetition refers to one or more of the downlink strategy or the relative time part of the future frame being different. In one embodiment, non-identical repetition is used to facilitate the interference environment being different in the repetitions and thus to increase the cumulative likelihood that the desired user terminal successfully receives the page over the likelihood in the case of identical repetition. For example, a different smart antenna strategy may be used, or different timing may be used to increase the likelihood that the interference environment is different. Downlink strategy diversity is provided by using a different downlink smart antenna strategy, or interference diversity is provided by repeating the page in a different interference environment. In one embodiment, both downlink strategy diversity and interference diversity are used.

In one embodiment, the feedback of success or not in paging is used. After a first unsuccessful page, the base station repeats the page in a future—e.g., the next—frame using, in one embodiment, a different non-directional downlink strategy.

In a first embodiment, the different non-directional strategy transmits towards another one of the eigenvectors that is substantially in the interference covariance matrix null space to determine a smart antenna processing strategy for downlink paging. Repeating in a future frame of the sequence of frames may provide for paging in the presence of a different set of interferers since the interference environment may be rapidly changing, for example because a different set of user terminals may be being paged in the next frame. Using a different eigenvector in the null space directs the page over a different radiation pattern, providing downlink strategy diversity.

The interference environment may not change sufficiently rapidly. Thus, in a second embodiment, the repetition is carried out in a different downlink data transfer period of the set of sequential time periods. In the case of TDMA, for example, this may coincide with a different timeslot. To generalize, the repeated transmission occurs on a different downlink conventional channel than the particular downlink traffic data transfer conventional channel of first transmission. For a FDMA system, this may be a different frequency.

Thus, in accordance to the second embodiment, the receive interference covariance matrix is determined from signals received at an acknowledgement transfer period that is associated with a different downlink data transfer period, and the eigenvector of the received interference covariance matrix with the smallest eigenvalue is used to determine the downlink spatial processing for the smart antenna system during transmission of the page during this different downlink data transfer period to facilitate repetition of the page in a different interference environment.

Alternate embodiments carry out the repeated paging with downlink strategies that are not necessarily determined from the interference covariance matrix. In yet another embodiment, the page towards a particular user terminal is repeatedly transmitted using a different one of a sequence of sets of weighting parameters for the smart antenna system designed to increase the probability that a user terminal at an unknown location receives the page. For example, U.S. patent application Ser. No. 09/020,619 to Barratt, et al., filed Feb. 9, 1998, and assigned to the assignee of the present invention, describes techniques for determining such a sequence. The sequence of weighting parameters used to in the smart antenna processing strategy to sequentially transmit the message is, according to one embodiment, an orthogonal sequence of complex valued weighting parameter sets based on the discrete Fourier transform (DFT). In order to further increase the chance of successful reception of the page, the repetitions of page transmission occur during different downlink data transfer periods to facilitate repetition of the page in a different interference environment.

In another embodiment using page repetition, pages are each transmitted with a broad, e.g., omnidirectional beam, but again during each different repetition the pages are transmitted during different downlink data transfer periods (e.g., different timeslots) to ensure that the repeating pages occur in different interference environments. The method of transmitting with an omnidirectional pattern is as described, for example, in above-referenced U.S. patent application Ser. No. 08/988,519 to Goldburg.

In one embodiment, each downlink data transfer period is divided into two halves for the purpose of paging. A page can be sent on the first half or the second half of any downlink data transfer period. This provides for relatively more paging messages possible within a given number of downlink data transfer periods. This also provides yet another method for changing the interference environment between repetitions of the page. After a page is sent in one half of a downlink data transfer period, the next repetition is sent in the other half of the next frame's downlink data transfer period, in one embodiment a different downlink data transfer period. Thus, the interference environment, at least with respect to paging transmissions, may change between the first and the second transmission.

Other embodiments may include splitting the downlink data transfer period into more than two paging periods.

FIG. 3 shows the sequence of frames for an embodiment of the invention used with TDMA. FIG. 3A shows three complete frames. FIG. 3B shows a single (the Nth) frame, and FIG. 3C shows how the downlink data transfer periods, in this case period D3, are divided into a first and second half for the purpose of paging. Similarly, FIG. 4 depicts an alternate, full duplex arrangement. FIG. 4C shows how the downlink data transfer periods, in this example, the period D3, are divided into a first and second half for the purpose of paging.

In one embodiment of the invention, the number of repetitions is a function of an estimate of the proximity of the desired user terminal to the paging base station. The proximity of the user terminal is estimated during an initial registration (e.g., log-in), or during a previous successful paging sequence. It is generally, but not necessarily, assumed that a user terminal estimated to be near the paging base station experiences less interference than a user terminal estimated to be far away. In one embodiment, the estimated closeness is one of near, far, and very far, and a near user terminal receives one page, i.e., no repetitions, a far user terminal receives two pages, i.e., one repetition, and a very far user terminal receives two repetitions.

However, alternate embodiments may use other criteria for determining various numbers of repetitions. A method for repeating transmitting a page from a base station having a smart antenna system to a user terminal using the smart antenna system, such that each repetition occurs in different interference environments has been disclosed in accordance with at least one embodiment of the invention.

Traffic Communication

In one embodiment of the invention, traffic communication between the base station and its associated user terminals occurs according to a radio protocol. The radio protocol provides a first set of sequential time intervals (frames) for first base station 102 to communicate with its associated user terminals. The radio protocol also provides further sets of sequential time intervals (frames) for each of a set of other base stations 111 of the wireless communication system.

FIG. 3 depicts a set of transmission time diagrams illustrating the transmission sequences in the case of one TDMA embodiment. FIG. 3A shows the overall division of time into a sequence of contiguous frames, in one embodiment having equal duration. Three complete sequential frames are illustrated in FIG. 3A. For purposes of system timing control, a synchronization channel which user terminals may consult as needed, is provided. In an alternate embodiment, each signalling segment starts with a frame marker signal from the base station to synchronize all remote user terminals to the timing sequence of the base station.

Figure 3A:
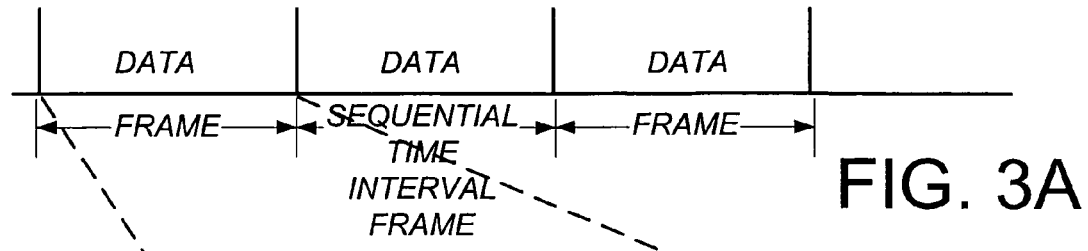
FIGS. 3A, 3B, 3C, 3D, and 3E illustrate signal timing arrangements in accordance with half duplex embodiments of the present invention.
Figure 3B:
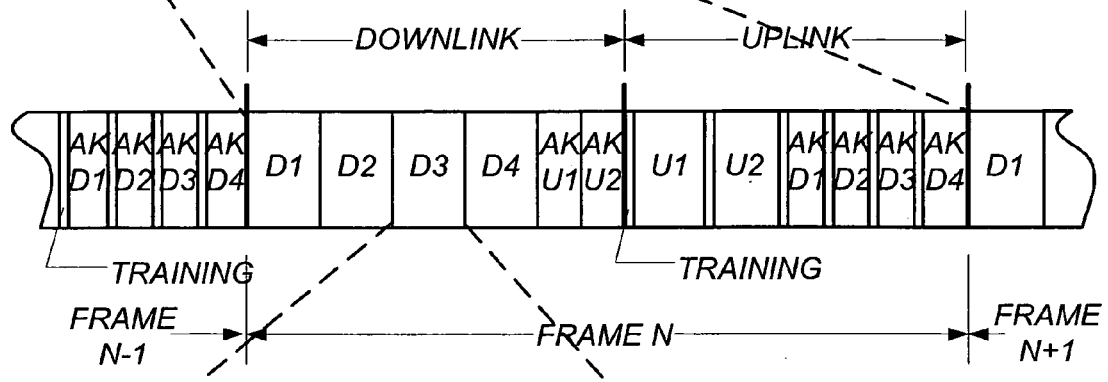
Figure 3C:

One aspect of the present invention relates primarily to the arrangements of signals within each frame, and accordingly an exemplary frame (frame N) is shown in greater detail in FIG. 3B, together with the end of the previous frame (frame N−1) and the start of the next frame (frame N+1).

The frame in accordance with one TDMA embodiment of the invention is subdivided into a selected number of downlink data transfer periods (timeslots) D1, D2, D3, etc., and a selected number of uplink data transfer periods (timeslots) U1, U2, etc. There also is a number of acknowledgement transfer periods (timeslots) AKD1, AKD2, AKD3, etc., on the uplink, one associated with each downlink data transfer period and having a predefined relationship to its associated downlink data transfer period known to the base station and, in one embodiment, fixed. There also is a number of acknowledgement transfer periods (timeslots) AKU1, AKU2, etc. on the uplink, one associated with each uplink data transfer period and having a predefined relationship to its associated uplink data transfer period known to the base station and, in one embodiment, fixed. For one TDMA embodiment, the fixed relationship between a data transfer period and its associated acknowledgement transfer period is specified by timeslots. That is, the particular timeslot for the data traffic period determines the timeslot for the associated acknowledgement transfer period in the opposite direction. Furthermore, in one embodiment, this relationship is the same for all sets of sequential time periods for all base stations of the system.

Note that for a TDMA embodiment, each data transfer periods corresponds to a conventional channel.

In the example illustrated in FIG. 3B, there are four downlink data transfer periods, thus four uplink acknowledgement transfer periods, and two uplink data transfer periods, and thus two downlink acknowledgement transfer periods. Recalling that SDMA facilitates more than one communication channel called spatial channels during the same timeslot, the example of FIG. 3B corresponds to accommodating at least four active user terminals communicating on the downlink and at least two active user terminals communicating on the uplink.

One feature of the sequence of time intervals is that it can accommodate a different number of data transfer periods on the uplink and on the downlink. In data communication, for example when the base station is coupled to a computer network such as the Internet, there typically is more communication on the downlink than on the uplink. One aspect of the invention is accommodating the asymmetry between uplink and downlink traffic data communication. A system may include a greater or lesser number of each type of period shown herein depending on the number of active user terminals to be accommodated in a particular channel and the data transfer requirements and capacities of the system in each direction. For higher data transfer rates, a larger number of users in any direction can be accommodated by various embodiments of the invention.

In one alternate embodiment, the same number of uplink and downlink data transfer periods exist in each sequential time interval, so that the total data carrying capacity of the set of provided downlink traffic channels is the same as the total data carrying capacity of the set of provided uplink traffic channels.

Downlink Traffic Communication

After a successful page, the access assignment message from first base station 102 assigns a downlink transfer period (i.e., a downlink traffic channel) and an associated acknowledgment transfer period (i.e., an associated uplink channel) within each sequential time interval in the first set of sequential time intervals.

Each user terminal that is successfully paged (e.g., that received an access assignment message as a result of initial downlink paging from its associated base station) responds to the paging sequence (e.g., to the access assignment message) on the uplink at the acknowledgement transfer period corresponding to its assigned downlink traffic transfer period. The first and further sets of sequential time intervals are such that the responses of the user terminals on the uplink to the initial downlink paging sequence (e.g., to the access assignment message), including responses from user terminals of other base stations such as second base station 111, occur on acknowledgement conventional channels— e.g., transfer periods and frequency/code channels-known to first base station 102. In particular, in one TDMA embodiment, the timings of base stations are synchronized, and the responses of any desired user terminals are aligned in time with possible responses of any interfering user terminals such as other co-channel user terminals associated with the first base station 102 or of other base stations 111 that may occur in the same frequency channel and downlink data transfer period.

The acknowledgement signal from the user terminal to its associated base station may include some training data and some identification information. In one embodiment, the training data includes the identification information. The identification information facilitates the first base station 102 to distinguish signals from its own associated user terminals from signals from user terminals of other base stations. The identification information may include a base station identifier. The first base station 102 receives the responses (i.e., the acknowledgments) and uses the training data and identifying information to determine a smart antenna processing strategy for transmitting data during a future—in one embodiment the next—downlink data transfer period for the user terminal.

A desirable smart antenna processing strategy of first base station 102 for transmitting the downlink traffic data to the user terminal is determined to include interference mitigation directed towards the co-channel interferers so that such interference from the transmitting base station towards such other co-channel user terminals is mitigated. Furthermore, a desirable smart antenna processing strategy for receiving the acknowledgment signals from the user terminal is determined in one embodiment to include interference mitigation from co-channel interferers.

In one embodiment, the acknowledgment includes an acknowledgment message (ACK) to provide feedback to the base station of successful reception at the user terminal of the signal from the base station. When the base station does not receive an expected ACK, or is fed back information that the message was not successfully received, the base station reschedules transmission of the data.

The first base station 102 now transmits data (i.e., traffic data) to the user terminal in the designated downlink data transfer period. The active user terminal receives the downlink traffic data transmitted to it from first base station 102. In one embodiment, the downlink signal transmitted to the user terminal, in addition to communicating the traffic data, also acts as a downlink polling signal to obtain a response on the uplink for determining the smart antenna processing strategy for further communication. Thus, in response to the downlink traffic data, during the next acknowledgement transfer period on the uplink for the designated downlink data transfer period, the user terminal transmits an acknowledgement signal back to the base station. The base station receives this acknowledgement, and also acknowledgements from one or more co-channel interfering user terminals that are assigned to the same downlink data transfer period, and uses these signals received from the user terminals to determine the smart antenna processing strategy to advantageously transmit data to the user terminal during the next designated downlink data transfer period for the user terminal. The determined downlink smart antenna processing strategy includes interference mitigation towards the co-channel remote terminals of other base stations 111. Furthermore, the first base station 102 also determines a processing strategy for its smart antenna system to advantageously receive the acknowledgment signals from desired and interfering co-channel remote terminals in a manner that includes interference mitigation from the interfering co-channel users. When the system, in accordance with one embodiment of the invention, also provides for more than one spatial channel in the same conventional channel, e.g., the same timeslot in a TDMA system, the determined smart antenna processing strategy includes interference mitigation for the co-channel interfering remote terminals of the same base stations 102 on other spatial channels of the same conventional channel.

Note that at a given acknowledgment transfer period for receiving acknowledgement signals from user terminals, the first base station 102 receives acknowledgments from user terminals which may be in response to a paging sequence (e.g., an access assignment messages) or to downlink traffic data.

Once downlink data transfer is so initiated, the downlink traffic data transfer continues at the designated downlink data transfer period frame by frame. Each downlink data signal also acts as a downlink polling signal. The user terminal receives the downlink data from its associated base station at the designated downlink data transfer period, and sends an acknowledgement signal back to the base station during the next designated acknowledgement transfer period. The acknowledgement signal is received at the base station, together with any other acknowledgement signals from other co-channel user terminals of the same or other base stations, and again the base station determines a processing strategy for its smart antenna system for optimally receiving the acknowledgements and for optimally transmitting the next downlink data signal at the next designated downlink data transfer period. By optimally is meant using a downlink strategy that mitigates interference from and towards interfering user terminals from which the first base station 102 receives acknowledgements while enhancing communication with one or more desired user terminals.

Thus, in the case that the smart antenna processing strategy determining uses signals received during a particular acknowledgement transfer period and is used for transmitting data during the next downlink data transfer period associated with the particular acknowledgement transfer period, the set of active user terminals being transmitted to during this next downlink data transfer period is a subset of the set of user terminals transmitting to their respective base station during the previous particular acknowledgement transfer period. In one embodiment, only a user terminal from which a signal was received at the previous particular acknowledgement transfer period is transmitted to on the downlink at the next associated downlink data transfer period. Thus, an active (i.e., not in the idle state) user terminal that is being transmitted to from a base station on a particular one of the downlink data transfer periods is known to have first transmitted data to the base station on a previous acknowledgement transfer period on the uplink associated with the same particular downlink data transfer period.

Initiating Uplink Communication from a User Terminal

According to another aspect of the invention, initiating communication on the uplink from one of the user terminals associated with the first base station 102 is provided. When the user terminal attempts to initiate data transmission to first base station 102, the user terminal first transmits a random access request signal on an agreed-upon logical control channel, and this random access request is received by the first base station 102. In response, the first base station 102 transmits an access assignment message to the user terminal, also on an agreed upon logical control channel, including transmitting information to the user terminal to indicate to the user terminal that the random access request signal has been received, and also including data to designate the uplink data transfer periods and frequency channel for receiving a data transfer on the uplink from the user terminal.

The user terminal, in response, sends the uplink traffic data during the designated uplink traffic transfer period. The base station receives the uplink data from the user terminal. User terminals of other base stations such as second base station 111 may also be transmitting uplink traffic data to their respective base stations, and these signals may interfere with the uplink traffic signal to first base station 102. Furthermore, when first base station 102 also provides for SDMA, its associated other user terminals that share the conventional channel may also so interfere. In accordance with one embodiment of the invention, the uplink data acts as a response to the access assignment message from the base station, and provides for the first base station 102 to use the response (i.e., the uplink traffic data) to determine a smart antenna processing strategy for reception of signals from the user terminal. In accordance with this one embodiment, the first and further sets of sequential time intervals are designed so that the uplink traffic signals are sent—either in response to the access assignment messages or as continuing uplink traffic data—at uplink conventional channels—e.g., data transfer periods and frequency/code channels—known to first base station 102. The first base station 102 receives the uplink traffic signals using a smart antenna processing strategy determined from received signals. The smart antenna processing strategy is for receiving data signals from its active associated user terminals. In one embodiment, each uplink traffic data signal within a designated uplink data transfer period includes training data to provide information to the base station for determining a processing strategy for the smart antenna system. The training data may include identification information. In one embodiment, a control computer provides for adaptation, such that the smart antenna processing strategy advantageously receives the uplink data within the same uplink data transfer period. In alternate embodiments in which the control computer does not have sufficient computational power to determined the uplink smart antenna processing strategy rapidly enough to optimally receive data for the same uplink data transfer period, the uplink strategy determining from data received within one uplink data transfer period is used by the smart antenna system to receive data at a future frame's uplink data transfer period, at a future—e.g., the next—uplink data transfer period for the particular user terminal. In a TDMA embodiment, the timings of base stations are synchronized, and the uplink data transfer periods of the desired user terminals and of interfering co-channel user terminals for transmitting to such user terminals' respective base stations may occur at the same timeslot and in the same frequency channel.

In one embodiment, when the base station successfully receives the uplink traffic data from an active user terminal, it transmits an acknowledgement signal to the user terminal during a designated acknowledgement transfer period on the downlink for the uplink data transfer period. The uplink traffic data signal is thus used as a reverse polling signal from the user terminal, and the response to this is the acknowledgement signal from the base station, which, after communication commences, can be considered as a reverse poll acknowledgement signal. The response to the further reverse poll acknowledgement signal (i.e., to the acknowledgement from the base station) may be used by the base station to further determine a processing strategy for its smart antenna system.

In one embodiment, in order to increase the likelihood that the acknowledgement on the downlink is successfully received at the user terminal, the first base station 102 uses the uplink traffic data that is being acknowledged to determine a processing strategy for its smart antenna system to advantageously transmit the acknowledgment to the user terminal at the next designated acknowledgment period on the downlink. The determined strategy includes interference mitigation towards one or more co-channel user terminals of other base stations or the first base station 102 from which uplink traffic data is received by the first base station 102.

In one embodiment, an acknowledgment signal sent to the user terminal from first base station 102 also provide the user terminal with an acknowledgment message (ACK) as feedback of successful reception at the base station. The acknowledgement message may also be a negative acknowledgement message (NACK) or other such feedback. When the user terminal either receives a NACK or does not receive an expected ACK, or is somehow fed back information that the message was not received, the user terminal reschedules transmission of the data. Furthermore, the acknowledgment signal may include training data to aid in successful reception at the user terminal. Furthermore, in one embodiment, one or more user terminals may include a smart antenna system, and in such a case, the acknowledgements on the downlink to uplink traffic may also be used to determine a smart antenna processing strategy for the smart antenna systems of the user terminals.

Uplink communication from the user terminal to the first base station 102 may continue frame-by-frame at the designated uplink data transfer periods. Each uplink data received by the base station may be used, together with any co-channel uplink traffic data from other interfering user terminals, to determine a processing strategy for the smart antenna system at the first base station 102 for receiving data from the user terminal, and the base station then also determines a processing strategy for its antenna system to transmit an acknowledgment signal to its associated user terminal as a further reverse poll acknowledgement signal.

While one embodiment of the invention is used in only one base station having a smart antenna system, in accordance to other embodiments, the communication system 100 may have base stations that each includes such a smart antenna system. In one embodiment, the first base station 102 and one or more second base stations 111 use identically configured sets of sequential time intervals, so that the first set of sequential time periods and the further sets of sequential time intervals have identical structure.

Figure 3D:
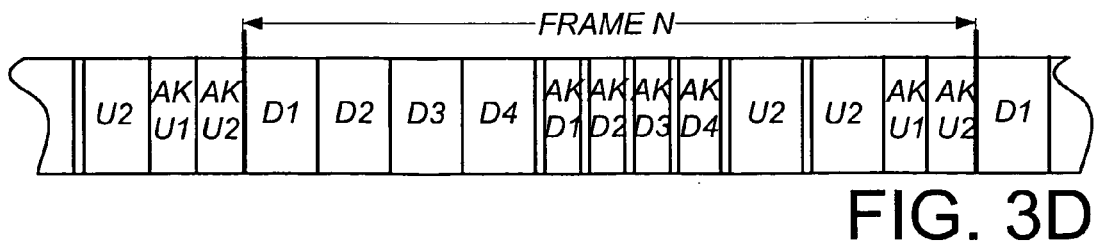
Figure 3E:
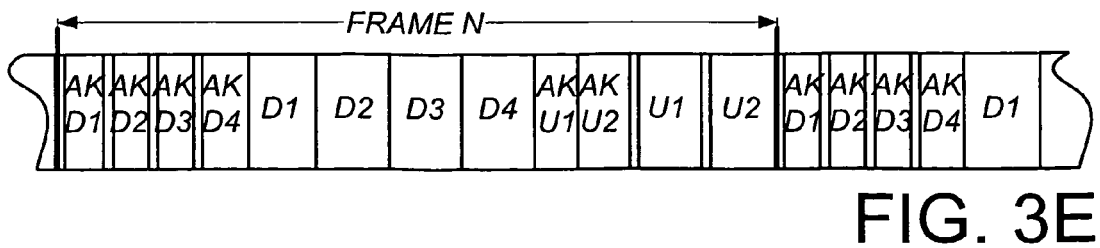

The signals shown in FIG. 3B are for a TDMA system that includes TDD, so uplink signals and downlink signals are grouped together to reduce the number of times the smart antenna system of the base station switches from uplink to downlink. As an alternate to the signals shown in FIG. 3B, the order of time periods may change, for example, when the base station uses frequency domain duplexing (FDD), wherein the downlink frequency and the uplink frequency are different for communicating with the same user terminal. One such alternative is shown in FIG. 3D. FIG. 3E shows another alternative, which is similar to the arrangement of FIG. 3B, but with shifted frame boundaries. Many other alternatives to the arrangement of FIG. 3B are possible without departing from the scope of the invention as set forth in the claims below.

Alternate Embodiments for Traffic Communication

One embodiment that utilizes the frame structure shown in FIG. 3 is a half duplex embodiment in which any uplink data transfer period of the set of frames is not necessarily associated with a downlink data transfer period for the same user terminal.

In accordance with one alternate half-duplex embodiment, the acknowledgement transfer period in a frame of the sequence of frames for acknowledging uplink data transfer is included in a future—e.g., the next—designated downlink data transfer period for the user terminal. Thus, data transferred on the downlink during a downlink data transfer period may include acknowledgement data and/or may include training data. Furthermore, there is a downlink data transfer period for every uplink data transfer period.

Furthermore, in accordance with another alternate half-duplex embodiment, the acknowledgement transfer period in a frame for acknowledging downlink data transfer (or responding to an access assignment message) is included in a future—e.g., the next—designated uplink data transfer period for the user terminal. Thus, data transferred during an uplink data transfer period may include training and/or identification data and/or acknowledgement data. Furthermore, there is an uplink data transfer period for every downlink data transfer period.

Figure 4A:
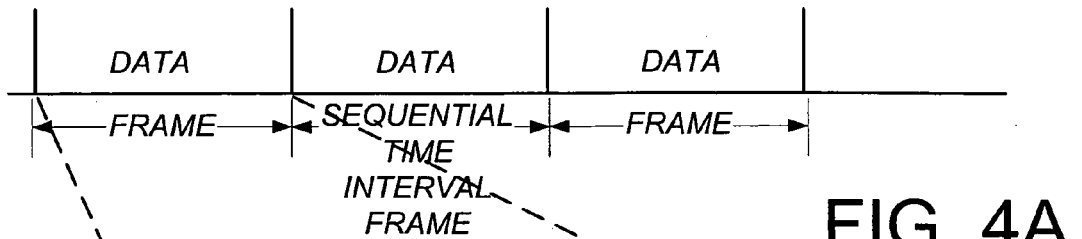
FIGS. 4A, 4B, and 4C illustrate signal timing arrangements in accordance with a full duplex embodiment of the present invention.
Figure 4B:
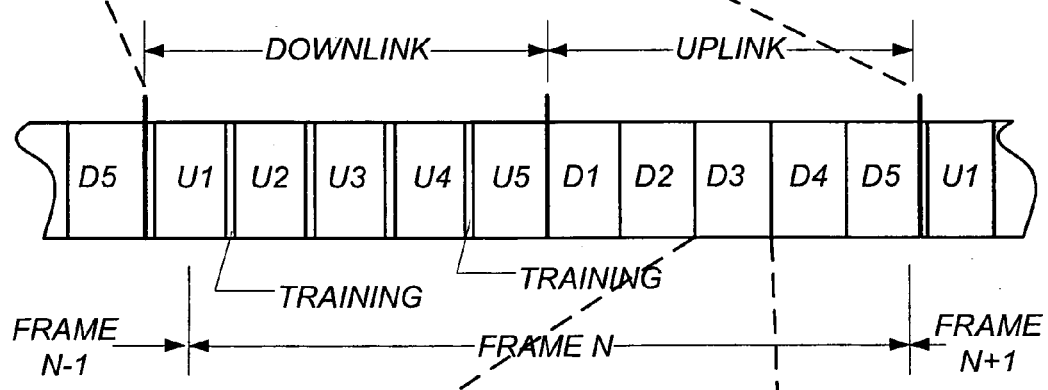
Figure 4C:

FIG. 4 is a set of transmission time diagrams illustrating transmission sequences in the case of yet another alternate embodiment that utilizes a full duplex system and thus referred to herein as a full duplex alternate embodiment. FIG. 4A shows the overall division of time into a sequence of contiguous frames of equal duration. Three complete sequential frames are illustrated in FIG. 4A.

An exemplary data transfer segment for a particular channel is shown in greater detail in FIG. 3B. The frame in accordance with the full duplex alternate embodiment of the invention is subdivided into a number of uplink data transfer periods, U1, U2, U3, etc. and the same number of downlink data transfer periods D1, D2, D3, etc. In the example illustrated in FIG. 4B there are five downlink and uplink data transfer periods, corresponding to accommodation of at least five active user terminals. Each active user terminal is assigned to an uplink and a downlink data transfer period, as described herein using an access assignment message from its associated base station. Other embodiments may have more or fewer downlink and uplink data transfer periods in each frame. For example, one embodiment uses a frame structure with three uplink and three downlink data transfer periods in each frame.

In accordance with the full duplex alternate embodiment, the acknowledgement transfer period in a frame of the sequence of time intervals for acknowledging uplink data transfer is included in a future—preferably the next—designated downlink data transfer period for the user terminal. Furthermore, the acknowledgement transfer period in a frame of the sequence of time intervals for acknowledging downlink data transfer (or responding to an access assignment message) is included in a future—preferably the next—designated uplink data transfer period for the user terminal.

Initiating data communication from a base station is carried out as described above for one half-duplex embodiment described herein. The base station first sends a paging message. The user terminal responds with a random access request. The base station responds with an access assignment message that includes specifying the uplink and downlink time periods to use for traffic communication.

When the user terminal receives the access assignment message, it sends an acknowledgement signal during its assigned uplink traffic channel. The signal may include training data and/or identification data for use by its associated base station in determining an advantageous smart antenna processing strategy for the radio link between the user terminal and the base station. The set of sequential time periods for first base station 102 is coordinated with the sets of sequential time periods for base station of other base stations, such as second base station 111, so that the responses to access assignment messages from user terminals are at time/frequency locations known a base station, so that a base station, for example first base station 102, receives not only signals—including interfering signals—from its associated user terminals, but also from co-channel user terminals associated with other base stations such as second base station 111. The advantageous smart antenna processing strategy for communicating with the user terminal is determined to include interference mitigation from the co-channel interferers (on the uplink) and towards the co-channel interferers (on the downlink).

Furthermore, when the base station receives uplink traffic data from at least one of its associated user terminals, it transmits an acknowledgement signal to such a user terminal in the downlink data transfer period corresponding to the uplink data transfer period in which it received the uplink data.

Thus, a signal is sent by a user terminal in response not only to an access assignment message from its associated base station, but also as an acknowledgment to downlink traffic data received from its associated base station.

Furthermore, in accordance with this full duplex alternate embodiment, uplink traffic data also includes training data and identification data, and the base station uses such data to determine a processing strategy for its smart antenna system.

Thus, data transferred on the downlink during a downlink data transfer period may include training data and may include acknowledgement data, such as ACK and/or NACK data, or other mechanism for acknowledgement, and data transferred during an uplink data transfer period may include training an/or identification data and/or acknowledgement data, such as ACK and/or NACK data, or some other acknowledgement data. When a transmitting entity receives a NACK or does not receive an expected ACK, or otherwise knows there has been unsuccessful reception, it re-schedules transmission of the data.

Yet another alternate embodiment of the invention is now described. In accordance with this alternate embodiment, for initiating communication from the base station, the base stations 102 and 111 each transmits a downlink polling signal to its respective associated active user terminals prior to receiving a data transmission from such user terminals. This polling is done in order to facilitate determination of a smart antenna processing strategy for particular packet data communication, in accordance with an embodiment of the present invention. In one embodiment, the downlink polling is carried out by the first base station 102 and the one or more second base stations 111 within a provided first set of sequential time intervals for first base station 102 and within provided further sets of sequential time intervals for each of second base stations 111, with each of the time intervals including a data transfer segment that has a selected number of downlink transfer periods, including forward polling periods, and a number of associated uplink transfer periods, each associated with a forward polling period, and a number of traffic data transfer periods.

FIG. 5 is a set of transmission time diagrams illustrating the transmission sequences in the case of this alternate embodiment. FIG. 5A shows the overall division of time into a sequence of contiguous frames of equal duration. Each frame includes a signalling segment, for transmission and reception of system overhead signals, such as cellular overhead, and a data transfer segment. Three complete sequential frames are illustrated in FIG. 5A. For purposes of system timing control, each signalling segment starts with a frame marker signal from the base station to synchronize all remote units to the timing sequence of the base station.

Figure 5A:
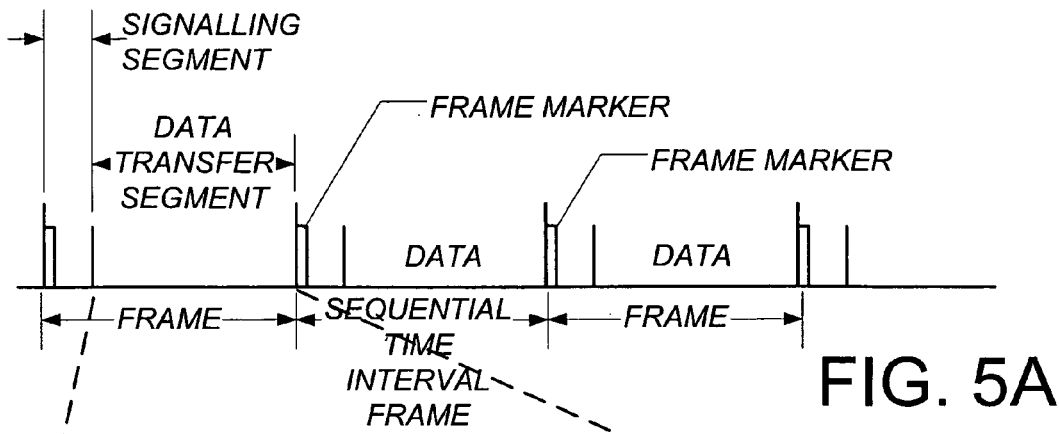
FIGS. 5A, 5B, 5C, and 5D illustrate signal timing arrangements in accordance with an alternate embodiment of the present invention.
Figure 5B:
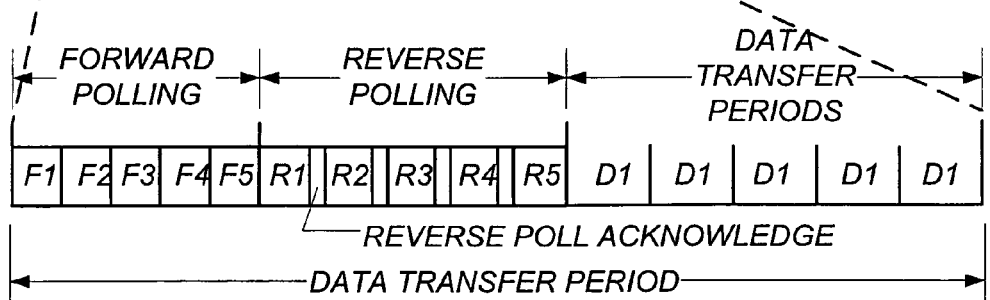

One aspect of the present invention relates primarily to the arrangements of signals within the data transfer segment of each frame, and accordingly an exemplary data transfer segment for a particular channel is shown in greater detail in FIG. 5B.

The data transfer segment in accordance with this alternate embodiment of the invention is subdivided into a number of forward polling periods F1, F2, F3, etc. a number of reverse polling periods R1, R2, R3, etc., and a number of traffic data transfer periods D1, D2, D3, etc. In the example illustrated in FIG. 5B there are five forward polling periods, five reverse polling periods and five traffic data transfer periods, corresponding to accommodation of at least five active user terminals. Each active user terminal is assigned to a signal channel and a forward polling period and a reverse polling period.

First base station 102 and the other base stations 111 transmit their downlink polling signals in their respective forward polling periods. Each user terminal that receives a polling signal from its associated base station responds to the polling signal at an uplink transfer period associated with the forward polling period. The associated uplink transfer period is part of the traffic data transfer period of the set of sequential time intervals of its associated base station. The first and further sets of sequential time intervals are such that the response of the user terminals to the downlink polling occurs at associated uplink transfer periods and frequency/code channels known to first base station 102.

Base station 102 receives the responses and uses the responses to determine a downlink processing strategy for the smart antenna system, and transmits data signals to its active associated user terminals using the determined downlink processing strategy. In one TDMA embodiment, the timings of base stations are synchronized, and the responses of the desired user terminals 105, 106, 107, 108, and the interfering user terminals 109, 110 to the downlink polling from such user terminals' respective base stations occur at the same timeslot and in the same frequency channel. The determined smart antenna processing strategy includes interference mitigation towards such interfering co-channel remote terminals.

For initiating communication from one of the user terminals associated with the first base station 102, when the user terminal desires to send a data transmission to the first base station 102, the user terminal transmits a reverse polling signal during a reverse polling period which is received by the first base station 102. The first base station 102 now transmits a reverse poll acknowledgement signal to the user terminal, including transmitting information to the user terminal to indicate to the user terminal that the reverse poll has been received and including data to designate the traffic data transfer period and frequency channel for receiving a data transfer on the uplink from the user terminal.

The user terminal then sends a data transfer signal, during the designated uplink traffic data transfer period. The data transfer signal may include training data in a training data segment of the uplink traffic data transfer period, as shown in FIG. 5D. The base station receives the signal from the user terminal. Other base stations such as second base station 111 may also be receiving signals in response to reverse polling acknowledgement from their respective bases stations, and these signals may interfere with the data transfer signal to first base station 102. In accordance with one embodiment of the invention, the first and further sets of sequential time intervals are such that the data transfer signals are sent in response to the reverse poll acknowledgement signals at uplink traffic data transfer periods and frequency/code channels known to first base station 102. First base station 102 receives the responses to the reverse polling acknowledgements and uses the responses to determine a processing strategy for the smart antenna system for receiving from its active associated user terminals.

First base station 102 then receives data signals from its active associated user terminals using the determined smart antenna processing strategy. In one TDMA embodiment, the timings of base stations are synchronized, and the responses of the desired user terminals 105, 106, 107, 108, and possibly interfering user terminals 109, 110 to the reverse poll acknowledgements from such user terminals' respective base stations may occur at the same timeslot and in the same frequency channel. The smart antenna processing strategy is determined to include interference mitigation from such interfering users.

In one embodiment, the system 100 includes the first base station 102 and one or more other base stations 111 that each have a smart antenna system, and the first base station 102 and other base stations 111 use identically configured sets of sequential time intervals, so that the first set of sequential time periods and the further sets of sequential time intervals have identical structure. In another embodiment, only the first base station 102 has a smart antenna system.

Figure 5C:
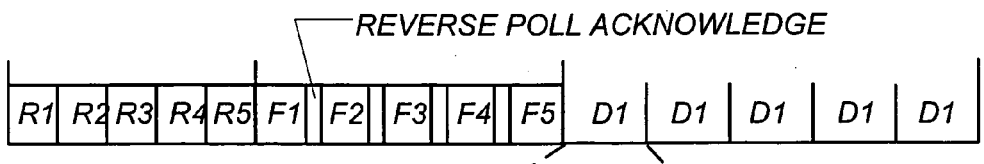
Figure 5D:
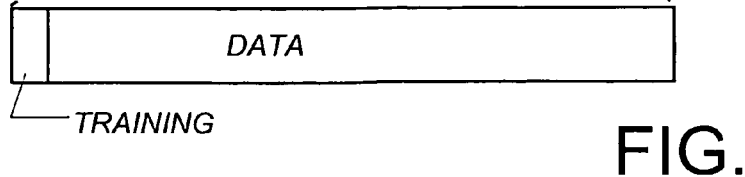

As an alternate to the signals shown in FIG. 5B, it might be advantageous to provide the reverse polling period first and the forward polling period second as shown in FIG. 5C. In this event, the base station can acknowledge the receipt of the reverse polling signal from a user terminal and designate a data transfer segment by a selected reverse poll acknowledgment signal during the corresponding forward polling period. In the case of forward polling, as described above, an acknowledgment is not required, since the transmission of the training signal by the user terminal at the start of the data transfer period constitutes sufficient knowledge to the base station that the user terminal has received the forward polling signal.

Alternate embodiments may use different ways of increasing the likelihood of successful reception at remote terminals of the overhead signalling and polling signals transmitted by the base stations. In one alternative, the overhead signalling and polling signals are transmitted over a broad beam using the elements of array 104 (see for example, U.S. patent application Ser. No. 08/988,519 to Goldburg, filed Dec. 12, 1997 and assigned to the assignee of the present invention).

Alternate embodiments may further use a pilot tone rather than a training signal in the responses of the user terminals. Other alternate embodiments may not include a training signal or pilot tone, and in such a case, known "blind" methods may be used to determine the weighting parameters for the smart antenna system of the first base station 102.

In yet other alternate embodiments, modifications may be made to other known polling arrangements that allow to obtain weighting parameters for a smart antenna system of a base station.

One such protocol that may be modified it that proposed by Z. Zhang and A. S. Amapora in "Performance of a modified polling strategy for broadband wireless LANs in a harsh fading environment," Proc. GLOBECOM'91, ("Zhang"), A. S. Amapora and S. V. Krishnamurthy, "New adaptive MAC layer protocol for wireless ATM networks in harsh fading and interference environments," Proc. ICUPC' 97, San Diego, Calif., 1997 ("Amapora and Krishnamurthy"), and S. V. Krishnamurthy, A. S. Amapora, and M. Zorzi, "Polling based media access protocol for use with smart adaptive array antennas," Proc. ICUPC' 98, pp. 337–341, 1998 ("Krishnamurthy"). Zhang proposes a token-based protocol that allows a base station's smart antenna system to periodically update its weighting parameters by sequentially polling each remote terminal. A remote terminal responds to a polling request either with an information request or an unmodulated pilot tone, and either response may be used to update weights. To modify the Zhang method to incorporate the invention, the protocol used by the base station and one or more other base stations are coordinated so that the information request or the unmodulated pilot signal received from remote user terminals of other base stations such as second base station 111 occur at time/frequency locations known to first base station 102, and are used to determine a processing strategy for the smart antenna system of first base station 102 to provide interference mitigation for or from user terminals associated with the other base stations. Amapora and Krishnamurthy propose a media access (MAC) protocol that claims to allows for faster adaptation than Zhang. Each transmission, in either direction, is immediately preceded by a remote to base-station pilot signal used to immediately adapt the array to that remote. Modification of the Amapora and Krishnamurthy method would be similar. In the Krishnamurthy scheme, any remote may piggyback its information requests to any information transfer between the base station and itself. Therefore, only remotes that have not transferred information in the previous frame are polled in the present frame. The frame size therefore not fixed but varies at least according to the number of polls included. In one variant, the base station uses limited polling in that at each poll, a remote sends one outstanding request to the base station, and in the second variant, the base station exhaustively polls each remote, and a remote, when polled sends all of its outstanding requests. A modified Krishnamurthy scheme may also be accommodated in an alternate embodiment of the present invention, in which the protocol used by a particular base station is coordinated with the protocols used by other base stations so that responses by remote terminals occur at time/frequency locations available to the particular base station.

While much of the above discussion has been for a TDMA system, the invention may also be implemented in a FDMA and a CDMA system.

The invention may be employed in hardware, software, or a combination thereof. For example, in one embodiment, the invention is implemented at least in part by information stored on a machine-readable medium, which information represents a set of instructions that, when executed by a machine (e.g., a data processing system employed by a communication device such as a base station or user terminal), cause the machine to perform at least a portion of a method embodied by the invention. The medium may include a storage material (e.g., magnetic storage disk, optical disk, etc.) and/or a memory device (e.g., ROM, RAM, DRAM, SRAM, etc.). One or more general-purpose and/or dedicated processors, such as digital signal processors (DSPs) may be employed by a base station or user terminal operating in conjunction with an embodiment of the present invention.

A user terminal in the context of the invention may represent various types of communication devices, and may be coupled to input and/or output devices and/or processing devices to provide various types of functionality, such as voice communications, data communications over the Internet or other data communication network.

It should further be appreciated that although the invention has been described in the context of communications and in particular, cellular communications systems employing at least one base station having a smart antenna system, the invention is not limited to such contexts and may be utilized in various wireless applications and systems, for example in a system that includes a communication device such as a communication station that includes a smart antenna system. Furthermore, the invention is not limited to any one type of architecture or air interface, and thus, may be utilized in conjunction with one or a combination of TDMA, FDMA, or CDMA, and TDD or FDD, or other architectures/protocols.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method in a wireless communication system comprising:
   providing a downlink channel for transmitting downlink data from a first communication device having a smart antenna system to a remote communication device;
   providing an associated channel for the first communication device to receive an uplink response signal from the remote communication device in response to the downlink data, the associated channel associated, and having a predefined relationship, with the downlink channel;
   providing an uplink data channel for the first communication device to receive uplink data signal from the remote communication device, the uplink data channel distinct from the associated channel;
   receiving the uplink response signal at the first communication device;
   determining a downlink smart antenna processing strategy using the received uplink response signal;

sending downlink data from the first communication device to the remote communication device using the determined downlink smart antenna processing strategy; and receiving uplink data from the remote communication device on the uplink data channel.

2. A method as described in claim 1, wherein the first communication device includes a base station, the remote communication device includes a user terminal associated with the base station and capable of communicating on the uplink and downlink with the base station, the smart antenna system includes a plurality of antenna elements, the downlink channel is a downlink traffic channel for communicating downlink traffic data, the sending of the uplink response signal is independent of any uplink traffic data being sent from the remote terminal to the base station, and the downlink smart antenna processing strategy of the sending downlink data step uses a recently received uplink response signal.

3. A method as described in claim 1, wherein the uplink data and downlink and uplink associated channels are conventional TDMA channels.

4. A method as described in claim 1, wherein the uplink data and downlink and uplink associated channels are conventional FDMA channels.

5. A method as described in claim 1, wherein the uplink data and downlink and uplink associated channels are conventional CDMA channels.

6. A method as described in claim 1, wherein the first communication device comprises a cellular base station.

7. A method as described in claim 1, wherein the remote communication device includes a second plurality of antenna elements.

8. A method as described in claim 7, wherein the remote communication device includes a second smart antenna system that includes the second plurality of antenna elements.

9. A method as described in claim 1, wherein the first communication device is coupled to an external data and/or voice network.

10. A method as described in claim 1, wherein the remote communication device includes a remote user terminal.

11. A method as described in claim 10, wherein the remote user terminal is mobile.

12. A method as described in claim 1, wherein at least one of the uplink and downlink data includes voice.

13. A method as described in claim 1, wherein at least one of the uplink and downlink data includes information exchanged via the Internet.

14. A method as described in claim 1, wherein the smart antenna system includes a plurality of antenna elements and a mechanism for uplink spatial processing signals received at the antenna elements according to a set of receive weighting parameters determined from the signals received at the antenna elements, and a mechanism for downlink spatial processing a signal for transmission according to a set of transmit weighting parameters, wherein the downlink strategy determining includes determining the set of uplink weighting parameters from the uplink response signal received during the step of receiving the uplink response signal and determining the set of downlink weighting parameters from the set of uplink weighting parameters.

15. A method as described in claim 14, wherein the downlink strategy determining step determines the transmit weighting parameters using a blind method and the most recently received uplink response signal.

16. A method as described in claim 14, wherein the uplink response signal includes training data and wherein the downlink strategy determining step determines the transmit weighting parameters using the training data in the most recently received uplink response signal.

17. A method as described in claim 1, wherein communication on the downlink channel and on the associated channel is frame-by-frame, and wherein the downlink strategy determining step determines the strategy using the uplink response signal received in the most recent frame.

18. A method as described in claim 17, wherein the uplink response signal includes acknowledgement data sent by the remote communication device in response to each frame from the first communication device received by the remote communication device.

19. A method as described in claim 17, wherein communications on the uplink and downlink channels and on the associated uplink channel are frame-by-frame, and wherein the uplink response signal includes acknowledgement data sent by the user terminal in response to each frame sent from the first communication device received by the remote communication device, the method further comprising:

providing an associated downlink channel from the first communication device to the remote communication device, the associated downlink channel associated with and having a predefined relationship with the uplink channel;

sending an uplink acknowledgement signal from the first communication device to the remote communication device on the associated downlink channel in response to each uplink frame from the user terminal received by the first communication device.

20. A method as described in claim 1, wherein the remote communication device is a user terminal of a set of user terminals able to communicate with the first communication device, each user terminal able to communicate on the uplink on a distinct uplink channel of a set of provided uplink channels and on the downlink on a distinct downlink channel of a set of provided downlink channels, the total data carrying capacity of the set of provided downlink channels being greater than the total data carrying capacity of the set of provided uplink channels, whereby the method accommodates the asymmetry between uplink and downlink traffic data communication.

21. A communication device comprising:

a smart antenna system to communicate with at least one remote communication device according to a smart antenna processing strategy, the smart antenna system including a plurality of antenna elements;

a downlink transmission unit, coupled to the antenna element plurality, to transmit downlink data on a downlink channel to the remote communication device;

an uplink reception unit, coupled to the antenna element plurality, to provide an associated channel to receive an uplink response signal from the remote communication device in response to the downlink data, the associated channel associated, and having a predefined relationship, with the downlink channel, the uplink reception unit further to provide an uplink data channel to receive an uplink data signal from the remote communication device, the uplink data channel being distinct from the associated channel; and a processor, coupled to the downlink transmission unit, and further coupled to the uplink reception unit, the processor to determine a downlink smart antenna processing strategy based on the uplink response signal.

22. A communication device as described in claim 21, wherein the uplink data and downlink and uplink associated channels are conventional TDMA channels.

23. A communication device as described in claim 21, wherein the uplink data and downlink and uplink associated channels are conventional FDMA channels.

24. A communication device as described in claim 21, wherein the uplink data and downlink and uplink associated channels are conventional CDMA channels.

25. A communication device as described in claim 21, wherein the first communication device comprises a cellular base station.

26. A communication device as described in claim 21, wherein the remote communication device includes a second plurality of antenna elements.

27. A communication device as described in claim 26, wherein the remote communication device includes a second smart antenna system that includes the second plurality of antenna elements.

28. A communication device as described in claim 21, wherein the first communication device is coupled to an external data and/or voice network.

29. A communication device as described in claim 21, wherein the remote communication device includes a remote user terminal.

30. A communication device as described in claim 29, wherein the remote user terminal is mobile.

31. A communication device as described in claim 21, wherein at least one of the uplink and downlink data includes voice.

32. A communication device as described in claim 21, wherein at least one of the uplink and downlink data includes information exchanged via the Internet.

33. A machine-readable medium having stored thereon information representing a set of machine-executable instructions, that, when executed by a machine, cause the machine to perform a method comprising:
providing a downlink channel for transmitting downlink data from a first communication device having a smart antenna system to a remote communication device;
providing an associated channel for the first communication device to receive an uplink response signal from the remote communication device in response to the downlink data, the associated channel associated, and having a predefined relationship, with the downlink channel;
providing an uplink channel for the first communication device to receive uplink data signal from the remote communication device, the uplink channel distinct from the associated channel;
receiving the uplink response signal at the first communication device;
determining a downlink smart antenna processing strategy using the received uplink response signal;
sending downlink data from the first communication device to the remote communication device using the determined downlink smart antenna processing strategy; and
receiving uplink data from the remote communication device on the uplink data channel.

34. A machine-readable medium as described in claim 33, wherein the first communication device includes a base station, the remote communication device includes a user terminal associated with the base station and capable of communicating on the uplink and downlink with the base station, the smart antenna system includes a plurality of antenna elements and provides variable antenna patterns, the downlink channel is a downlink traffic channel for communicating downlink traffic data, the sending of the uplink response signal is independent of any uplink traffic data being sent from the remote terminal to the base station, and the downlink smart antenna processing strategy of the sending downlink data step uses a recently received uplink response signal.

35. A machine-readable medium as described in claim 33, wherein the uplink data and downlink and uplink associated channels are conventional TDMA channels.

36. A machine-readable medium as described in claim 33, wherein the uplink data and downlink and uplink associated channels are conventional FDMA channels.

37. A machine-readable medium as described in claim 33, wherein the uplink data and downlink and uplink associated channels are conventional CDMA channels.

38. A machine-readable medium as described in claim 33, wherein the first communication device comprises a cellular base station.

39. A machine-readable medium as described in claim 33, wherein the remote communication device includes a second plurality of antenna elements.

40. A machine-readable medium as described in claim 39, wherein the remote communication device includes a second smart antenna system that includes the second plurality of antenna elements.

41. A machine-readable medium as described in claim 33, wherein the first communication device is coupled to an external data and/or voice network.

42. A machine-readable medium as described in claim 33, wherein the remote communication device includes a remote user terminal.

43. A machine-readable medium as described in claim 42, wherein the remote user terminal is mobile.

44. A machine-readable medium as described in claim 33, wherein at least one of the uplink and downlink data includes voice.

45. A machine-readable medium as described in claim 33, wherein at least one of the uplink and downlink data includes information exchanged via the Internet.

46. A machine-readable medium as described in claim 33, wherein the smart antenna system includes a plurality of antenna elements and a mechanism for uplink spatial processing signals received at the antenna elements according to a set of receive weighting parameters determined from the signals received at the antenna elements, and a mechanism for downlink spatial processing a signal for transmission according to a set of transmit weighting parameters, wherein the downlink strategy determining step includes determining the set of uplink weighting parameters from the uplink response signal received during the step of receiving the uplink response signal and determining the set of downlink weighting parameters from the set of uplink weighting parameters.

47. A machine-readable medium as described in claim 46, wherein the downlink strategy determining step determines the transmit weighting parameters using a blind method and the most recent uplink response signal.

48. A machine-readable medium as described in claim 46, wherein the uplink response signal includes training data and wherein the downlink strategy determining step determines the transmit weighting parameters using the training data in the most recently received uplink response signal.

49. A machine-readable medium as described in claim 33, wherein communication on the downlink channel and on the associated channel is frame-by-frame, and wherein the downlink strategy determining step determines the strategy using the uplink response signal received in the most recent frame.

50. A machine-readable medium as described in claim 49, wherein the uplink response signal includes acknowledgement data sent by the remote communication device in response to each frame from the first communication device received by the remote communication device.

51. A machine-readable medium as described in claim 49, wherein communications on the uplink and downlink channels and on the associated uplink channel are frame-by-frame, and wherein the uplink response signal includes acknowledgement data sent by the remote communication device in response to each frame sent from the first communication device received by the remote communication device, the method further comprising:
   providing an associated downlink channel from the first communication device to the remote communication device, the associated downlink channel associated with and having a predefined relationship with the uplink channel;
   sending an uplink acknowledgement signal from the first communication device to the remote communication device on the associated downlink channel in response to each uplink frame from the user terminal received by the first communication device.

52. A machine-readable medium as described in claim 33, wherein the remote communication device is a user terminal of a set of user terminals able to communicate with the first communication device, each user terminal able to communicate on the uplink on a distinct uplink channel of a set of provided uplink channels and on the downlink on a distinct downlink channel of a set of provided downlink channels, the total data carrying capacity of the set of provided downlink channels being greater than the total data carrying capacity of the set of provided uplink channels,
   whereby the method accommodates the asymmetry between uplink and downlink traffic data communication.

53. A communication device in a communication system, the communication device comprising:
   a smart antenna system to communicate with one or more remote communication devices according to a smart antenna processing strategy, the smart antenna system including a plurality of antenna elements;
   a downlink transmission unit, coupled to the antenna element plurality, to provide a set of downlink channels, and to transmit downlink data frame-by-frame to a first remote communication devices of the one or more remote communication devices on a first downlink channel of the provided set of downlink channels;
   an uplink reception unit, coupled to the antenna element plurality, to provide a set of one or more associated channels on the uplink, each associated channel on the uplink associated, and having a predefined relationship, with one of the set of downlink channels, the set of associated channels including a first associated channel to receive one or more uplink response signals from the first remote user terminal in response to the downlink data and according to a first uplink smart antenna strategy; the uplink reception unit further to provide a set of one or more uplink data channels to receive uplink data frame by frame from one or more of the remote communication devices, the uplink data channels being distinct from the associated channels; and
   a processor, coupled to the downlink transmission unit, and further coupled to the uplink reception unit, the processor to determine the first uplink smart antenna strategy and a downlink smart antenna processing strategy based on the received first uplink response signal.

54. A communication device as described in of claim 53, wherein the transmit unit transmits any downlink traffic data frame using a smart antenna processing strategy determined by the processor using the uplink response signal received in the most recent previous frame.

55. A communication device as described in of claim 53, wherein the uplink smart antenna processing strategy includes uplink spatial processing of signals received at the antenna elements according to a set of receive weighting parameters determined from the signals received at the antenna elements, wherein the downlink smart antenna processing strategy includes downlink spatial processing a signal for transmission according to a set of transmit weighting parameters, wherein the processor determines the set of uplink weighting parameters from the received first uplink response signal and determines the set of downlink weighting parameters from the set of uplink weighting parameters.

56. A communication device as described in of claim 53, wherein the total data carrying capacity of the set of provided downlink traffic channels being greater than the total data carrying capacity of the set of provided uplink traffic channels.

57. A communication device as described in of claim 53, wherein the total data carrying capacity of the set of provided downlink traffic channels is the same as the total data carrying capacity of the set of provided uplink traffic channels.

58. A communication device as described in of claim 53, wherein the transmit unit further provides an associated channel on the downlink for each uplink data channel having a predefined relationship to the downlink channel, and wherein the transmit unit further is to transmit an acknowledgement to the first user terminal in response to receiving uplink data on the first uplink traffic channel, the acknowledgment transmitted on the associated channel on the downlink associated with the first uplink traffic channel.

59. A communication device as described in of claim 55, wherein the processor additionally uses one or more uplink response signals received from one or more other co-channel remote communication devices to determine the downlink weighting parameters for transmitting to the first remote communication device such that the determined downlink smart antenna processing strategy includes interference mitigation towards the other co-channel remote communication devices.

60. A communication device as described in of claim 53, wherein the set of remote communication devices being transmitted to by the transmit unit during a first frame on the first downlink channel is a subset of the set of remote communication devices that transmitted an uplink response signals on the associated channel on the uplink associated with the first downlink channel during the most recently occurring frame to the first frame.

* * * * *